US010536633B2

(12) United States Patent
Kuwada et al.

(10) Patent No.: US 10,536,633 B2
(45) Date of Patent: Jan. 14, 2020

(54) IMAGE PROCESSING DEVICE, IMAGING SYSTEM AND IMAGING APPARATUS INCLUDING THE SAME, AND IMAGE PROCESSING METHOD

(71) Applicant: PANASONIC INTELLECTUAL PROPERTY MANAGEMENT CO., LTD., Osaka (JP)

(72) Inventors: Junya Kuwada, Fukuoka (JP); Ryoji Ogino, Fukuoka (JP); Ryo Hirota, Osaka (JP); Akio Nishiyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 788 days.

(21) Appl. No.: 15/003,160

(22) Filed: Jan. 21, 2016

(65) Prior Publication Data

US 2016/0234437 A1 Aug. 11, 2016

(30) Foreign Application Priority Data

Feb. 6, 2015 (JP) .................................. 2015-022410
Apr. 23, 2015 (JP) .................................. 2015-088487

(51) Int. Cl.
| | |
|---|---|
| *H04N 5/232* | (2006.01) |
| *H04N 5/265* | (2006.01) |
| *H04N 5/235* | (2006.01) |
| *G06T 5/00* | (2006.01) |
| *G06K 9/46* | (2006.01) |
| *G06T 7/40* | (2017.01) |

(Continued)

(52) U.S. Cl.
CPC ....... *H04N 5/23238* (2013.01); *H04N 1/3876* (2013.01); *H04N 5/235* (2013.01);
(Continued)

(58) Field of Classification Search
CPC ........ G06K 2009/2045; G06T 2200/32; H04N 5/23238; H04N 1/3876
See application file for complete search history.

(56) References Cited

U.S. PATENT DOCUMENTS

| | | | |
|---|---|---|---|
| 2001/0019363 A1 | 9/2001 | Katta et al. | |
| 2002/0122113 A1* | 9/2002 | Foote .................... | G06T 3/4038 348/48 |

(Continued)

FOREIGN PATENT DOCUMENTS

| | | |
|---|---|---|
| JP | 2001-320616 A | 11/2001 |
| JP | 2004-072677 A | 3/2004 |

(Continued)

*Primary Examiner* — Mainul Hasan
(74) *Attorney, Agent, or Firm* — Greenblum & Bernstein, P.L.C.

(57) ABSTRACT

An image processing device includes a reference camera determiner that determines one among the multiple cameras, as a reference camera; an imaging condition acquisition unit that acquires imaging conditions relating to exposure and white balance which are set in the reference camera; an imaging condition setter that sends a command to set the imaging conditions relating to the exposure and the white balance, based on the imaging conditions in the reference camera, to cameras other than the reference camera; and an image composition unit that performs image composition processing on the multiple captured images that are acquired from the multiple cameras and that outputs the panoramic composite image. Thus, a boundary of an area of each composed image in the panoramic composite image that results from the composition is suppressed from being unnaturally conspicuous, and the captured image that is a reference is suitably displayed.

9 Claims, 18 Drawing Sheets

(51) Int. Cl.
*G06T 7/00* (2017.01)
*G06K 9/62* (2006.01)
*H04N 5/247* (2006.01)
*H04N 9/73* (2006.01)
*H04N 1/387* (2006.01)
*G06K 9/20* (2006.01)

(52) U.S. Cl.
CPC ............ *H04N 5/247* (2013.01); *H04N 5/265* (2013.01); *H04N 9/735* (2013.01); *G06K 2009/2045* (2013.01); *G06T 2200/32* (2013.01)

(56) References Cited

U.S. PATENT DOCUMENTS

2003/0234866 A1* 12/2003 Cutler .................... G06T 5/008 348/207.1
2006/0078224 A1    4/2006 Hirosawa
2007/0285282 A1* 12/2007 Nakayama ................ B60R 1/00 340/937
2010/0321470 A1   12/2010 Oshima
2014/0016005 A1*   1/2014 Kishima ................ H04N 5/367 348/246
2015/0116453 A1    4/2015 Hirata et al.

FOREIGN PATENT DOCUMENTS

| | | |
|---|---|---|
| JP | 2008-028521 A | 2/2008 |
| JP | 2010-050842 | 3/2010 |
| JP | 2011-004340 A | 1/2011 |
| JP | 2011-171813 A | 9/2011 |
| JP | 5225313 | 3/2013 |
| JP | 2013-243602 | 12/2013 |
| WO | 2013/186806 A1 | 12/2013 |

* cited by examiner

PA TO PG INDICATE RANGES OF IMAGES THAT ARE CAPTURED BY FIRST TO SEVENTH CAMERAS, RESPECTIVELY

FIG. 4A1
FIG. 4B1
PARALLAX CORRECTION IS NOT PERFORMED
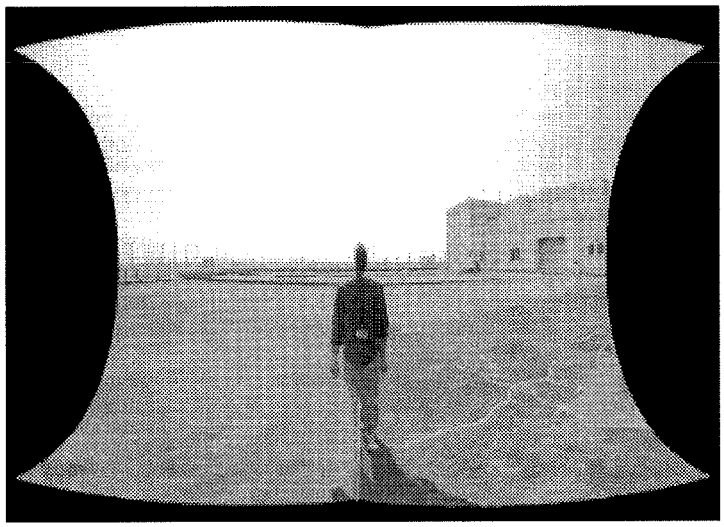
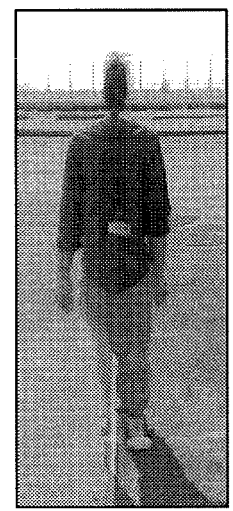
FIG. 4A2
FIG. 4B2
PARALLAX CORRECTION IS PERFORMED
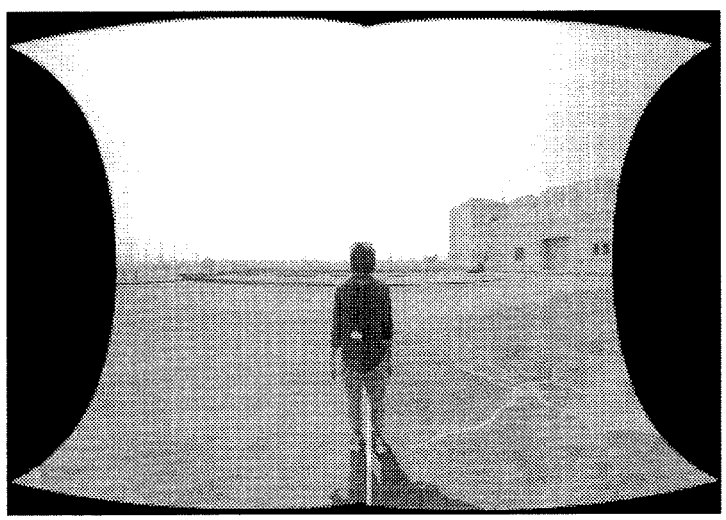
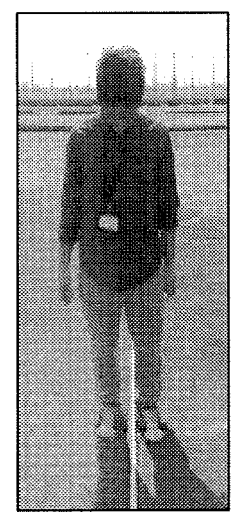

SCREEN OF DISPLAY DEVICE
IN IMAGE ABNORMALITY
WARNING MODE

SCREEN OF DISPLAY DEVICE IN
AMOUNT-OF-PARALLAX-
CORRECTION ADJUSTMENT
MODE

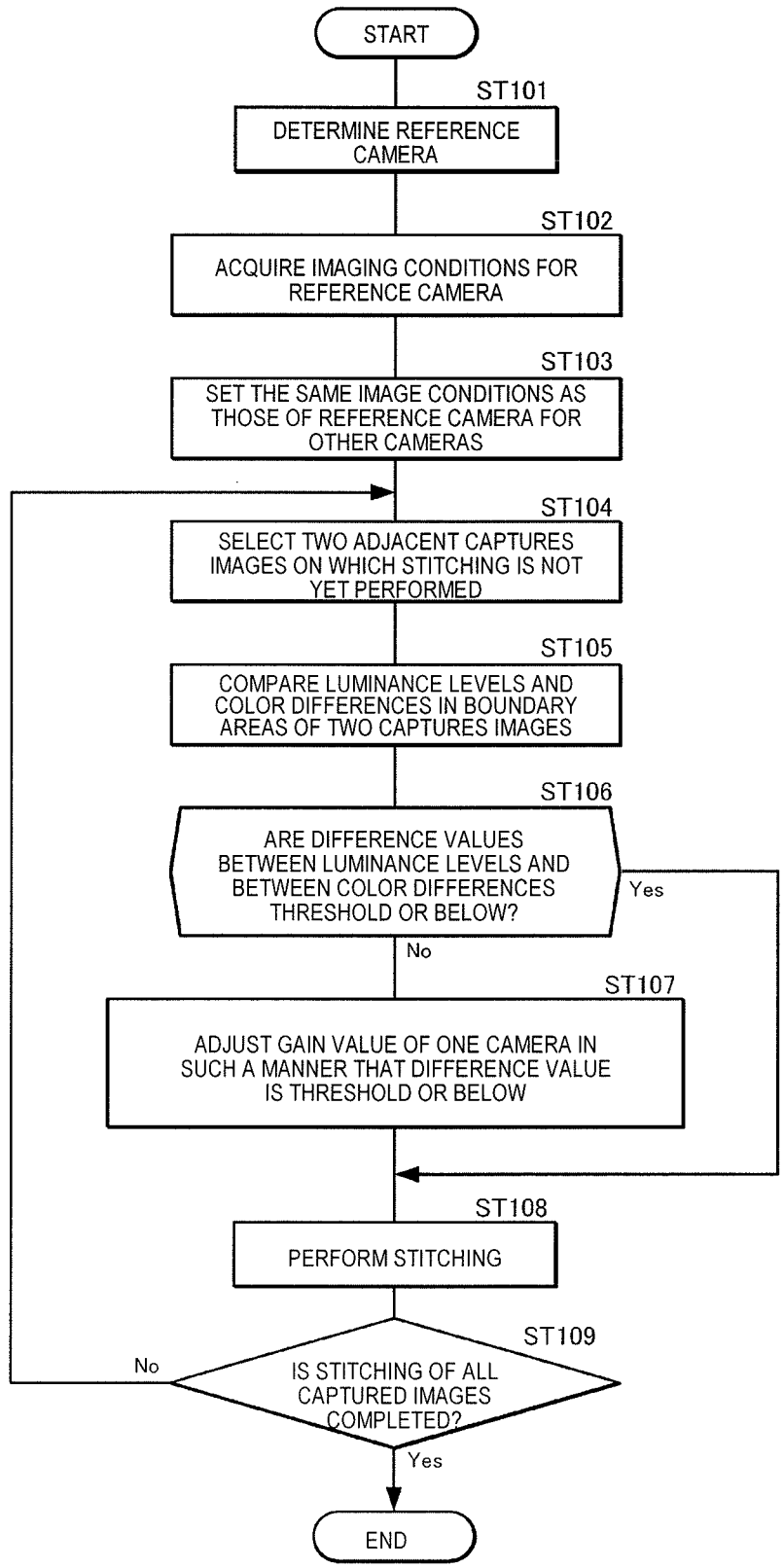

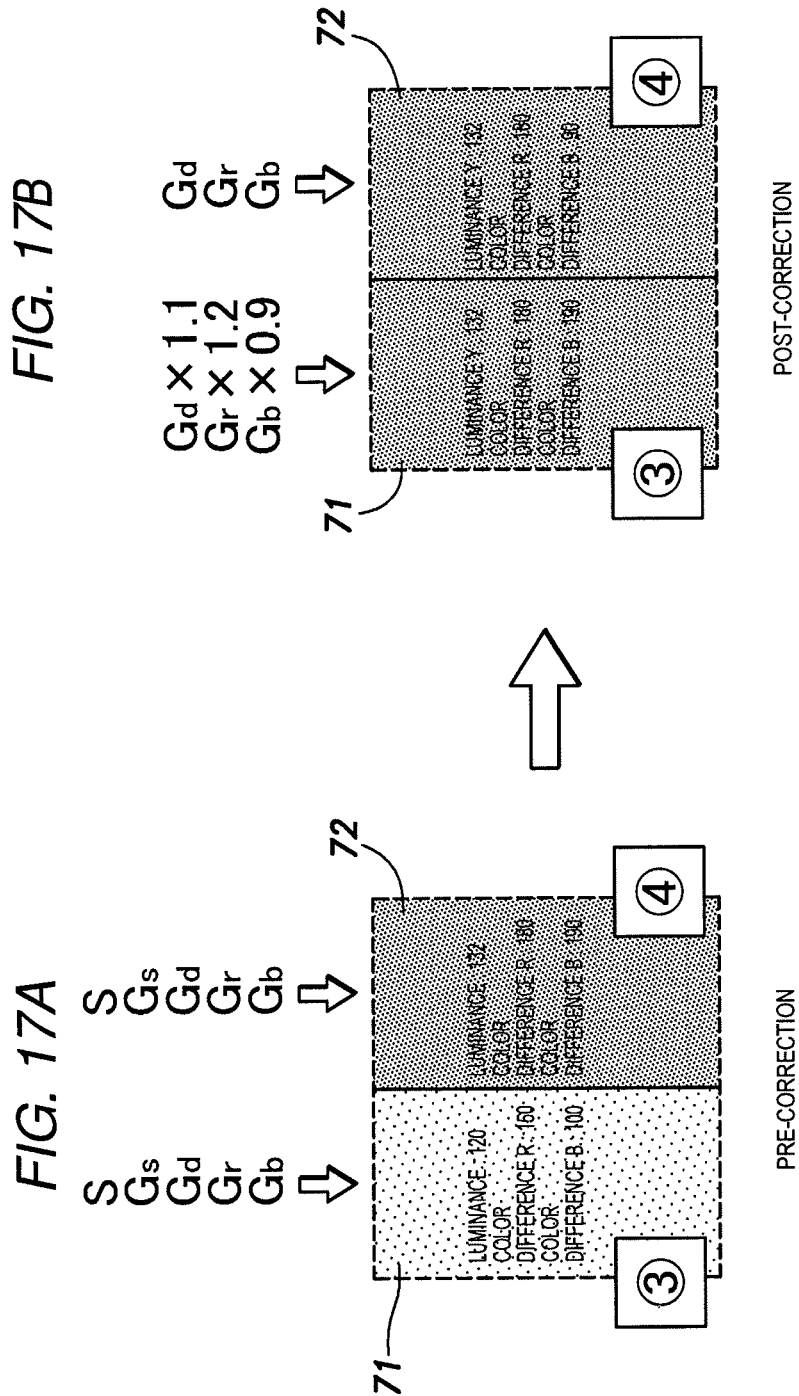

IMAGE PROCESSING DEVICE, IMAGING SYSTEM AND IMAGING APPARATUS INCLUDING THE SAME, AND IMAGE PROCESSING METHOD

BACKGROUND OF THE INVENTION

1. Field of the Invention

The present disclosure relates to an image processing device that performs image composition processing on multiple captured images and outputs a composite image, an imaging system and an imaging apparatus that include the image processing device, and an image processing method.

2. Description of the Related Art

A wide angle image that cannot be obtained with one camera can be generated in a seamless state, by performing so-called stitching processing that composes images that are captured by multiple cameras and generates one composite image (a panoramic image). In this stitching processing, two adjacent cameras are arranged in such a manner that portions of image capture areas overlap, and images are composed by superimposing image areas of boundary portions that correspond to overlapping portions of image capture areas of two cameras, on each other, or by suitably performing trimming.

On the other hand, when photographic subjects that are positioned at greatly different distances from the camera are present, that is, a photographic subject in the background and a photographic subject in the foreground are present in the overlapping portions of the image capture areas of the two cameras, a defect occurs in that a state where deviation takes place in a positional relationship between a shape of the photographic subject in the background and a shape of the photographic subject in the foreground, that is, so-called parallax occurs between captured images that are acquired by two cameras, and thus, in a composite image, the same two foreground shapes appear in an overlapping manner or one portion of the foreground shape is lost. In the stitching, parallax correction that suppresses a defect in the image due to the parallax is performed.

With regard to this parallax correction, for example, Japanese Patent Unexamined Publication No. 2010-50842 discloses that, with block matching that is based on an edge or a feature quantity, a positional relationship between shapes of photographic subjects that appear in captured images that are acquired by two cameras is acquired, and parallax correction that deforms an image is performed based on this information. Particularly, with this technology, a stitching point that defines the degree to which the image is deformed at the time of the parallax correction is changed for every frame, and a suitable composite image is generated for every frame.

Furthermore, for example, Japanese Patent No. 5225313 discloses that a curved stitching boundary is set for two images in such a manner that an image area in which a foreground shape such as that of a person appears, that is, an image area in which a cost function is high is avoided, trimming that cuts off the two images along the stitching boundary is performed, and then image composition is performed. Particularly, with this technology, optimization of the stitching boundary is set to be performed considering the continuity of frames, and, thus, the stitching boundary that is temporally stable can be set. Because of this, when a composite image is displayed as a moving image, an occurrence of an unnatural motion in the shape of the photographic subject that appears in the image can be avoided.

However, when the stitching point is changed for every frame, and a change in the image, which is likely to have an influence on the parallax between the two images, occurs, the stitching point changes greatly between frames. As a result, a sudden change in the image occurs between the frames, and when the composite image is displayed as a moving image, an unnatural motion occurs in the shape of the photographic subject that appears in the image. This gives a viewer a feeling that something is wrong.

On the other hand, if the stitching boundary that is temporally stable is set, when the composite image is displayed as a moving image, the occurrence of the unnatural motion in the shape of the photographic subject that appears in the image can be avoided. However, an amount of computation in the stitching processing is large, and in a case where information on a future frame is necessary, it is difficult to perform real time processing that, in real time, outputs the image which is captured in the camera while performing the stitching processing.

Additionally, when the stitching processing is performed on the captured images (the composed images) that are acquired by the multiple cameras in which imaging conditions are set individually, without any change, a boundary of an area of each of the captured images in the composite image is made to be unnaturally conspicuous by a difference in brightness or shade between the captured images.

It is also thought that the imaging conditions relating to exposure or white balance are set equally for all the cameras. However, a case can occur in which the exposure or the white balance is not suitably set in the camera that acquires the captured image (for example, a captured image that has high importance, which a user is likely to pay attention to) that is a reference, and in which an imaging target is not suitably displayed (for example, blown-out highlight, blocked-up shadows, or the like occur).

SUMMARY OF THE INVENTION

An object of the present disclosure is that, in panoramic composite image, a boundary of an area of each captured image that is composed is suppressed from being unnaturally conspicuous while an area of a captured image that is a reference is suitably displayed. Another object of the present disclosure is to prevent an unnatural motion from occurring in a shape of a photographic subject that appears in a display image, without giving a viewer a feeling that something is wrong when a panoramic composite image is displayed as a moving image in a case where parallax correction that deforms an image according to parallax is performed on multiple captured images for composition.

According to an aspect of the present disclosure, there is provided an image processing device that is connected to multiple cameras in such a manner that communication with the multiple cameras is possible, and that outputs a panoramic composite image by performing image composition processing on multiple captured images that are acquired from the multiple cameras, the device including: a reference camera determiner that determines one among the multiple cameras, as a reference camera; an imaging condition acquisition unit that acquires imaging conditions relating to exposure and white balance which are set in the reference camera; an imaging condition setter that sends a command to set the imaging conditions relating to the exposure and the white balance, based on the imaging conditions in the reference camera, to cameras other than the reference camera among the multiple cameras; and an image composition unit that performs image composition processing on the multiple captured images that are acquired from the multiple cameras and that outputs the panoramic composite image.

The image processing device according to the aspect of the present disclosure may further include: an amount-of-parallax-correction calculator that calculates an amount of parallax correction which corresponds to parallax between the two adjacent captured images; a filter that limits an amount of change over time, on the amount of parallax correction that is output from the amount-of-parallax-correction calculator; and a parallax corrector that performs parallax correction processing on the captured image, based on the amount of parallax correction that is output from the filter, in which the image composition unit may perform image composition processing on a parallax correction image that is output from the parallax corrector, and may output the panoramic composite image.

According to another aspect of the present disclosure, there is provided an imaging system including: the image processing device according to any one described above; and the multiple cameras.

According to still another aspect of the present disclosure, there is provided an imaging apparatus including: multiple imaging elements; and an image processor that performs image composition processing on multiple captured images which are acquired by the imaging elements and outputs a panoramic composite image, in which the image processor includes a reference imaging element determiner that determines one among the multiple imaging elements, as a reference imaging element, an imaging condition acquisition unit that acquires imaging conditions relating to exposure and white balance which are set in the reference imaging element, an imaging condition setter that sends a command to set the imaging conditions relating to the exposure and the white balance, based on the imaging conditions in the reference imaging element, to imaging elements other than the reference imaging element among the multiple imaging elements, and an image composition unit that performs image composition processing on the multiple captured images that are acquired from the multiple imaging elements and that outputs the panoramic composite image.

In the imaging apparatus according to the aspect of the present disclosure, the image processor may further include an amount-of-parallax-correction calculator that calculates an amount of parallax correction which corresponds to parallax between the two adjacent captured images, a filter that limits an amount of change over time, on the amount of parallax correction that is output from the amount-of-parallax-correction calculator; and a parallax corrector that performs parallax correction processing on the captured image based on the amount of parallax correction that is output from the filter, and image composition processing may be performed on a parallax correction image that is output from the parallax corrector, and the panoramic composite image may be output.

According to still another aspect of the present disclosure, there is provided an image processing method of performing image composition processing on multiple captured images that are acquired by multiple cameras and outputting a panoramic composite image, for use in an image processing device that is connected to the multiple cameras in such a manner that communication with the multiple cameras is possible, the method including: determining one among the multiple cameras, as a reference camera; acquiring imaging conditions relating to exposure and white balance which are set in the reference camera; sending a command to set the imaging conditions relating to the exposure and the white balance, based on the imaging conditions in the reference camera, to cameras other than the reference camera among the multiple cameras; and performing image composition processing on the multiple captured images that are acquired from the multiple cameras and outputting the panoramic composite image.

The image processing method according to the aspect of the present disclosure may further include: calculating an amount of parallax correction which corresponds to parallax between the two adjacent captured images; limiting an amount of change over time, on the amount of parallax correction that is generated in the calculating of the amount of parallax correction; performing parallax correction processing on the captured image, based on the amount of parallax correction that is generated in the limiting of the amount of change over time; and performing image composition processing on a parallax correction image that is generated in the performing of the parallax correction processing, and outputting the panoramic composite image.

According to still another aspect of the present disclosure, there is provided an image processing method of performing image composition processing on multiple captured images that are acquired from multiple imaging elements and outputting a panoramic composite image, for use in an imaging apparatus that includes the multiple imaging elements, the method including: determining one among the multiple imaging elements, as a reference imaging element; acquiring imaging conditions relating to exposure and white balance which are set in the reference imaging element; sending a command to set the imaging conditions relating to the exposure and the white balance, based on the imaging conditions in the reference imaging element, to imaging elements other than the reference imaging element among the multiple imaging elements; and performing image composition processing on the multiple captured images that are acquired from the multiple imaging elements and outputting the panoramic composite image.

The image processing method according to the aspect of the present disclosure may further including: calculating an amount of parallax correction which corresponds to parallax between the two adjacent captured images; limiting an amount of change over time, on the amount of parallax correction that is generated in the calculating of the amount of parallax correction; performing parallax correction processing on the captured image, based on the amount of parallax correction that is generated in the limiting of the amount of change over time; and performing image composition processing on a parallax correction image that is generated in the performing of the parallax correction processing, and outputting the panoramic composite image.

According to the present disclosure, in a panoramic composite image, a boundary of an area of each captured image that is composed can be suppressed from being unnaturally conspicuous while an area of a captured image that is a reference is suitably displayed. Furthermore, according to the present disclosure, because an amount of change over time by which an amount of parallax correction is changed is limited by a filter, even if a change in which two captured images are greatly different in parallax from each other occurs, the amount of parallax correction is set to be changed in stages instead of being suddenly changed. Because of this, image deformation that is performed in a parallax corrector based on an amount of parallax correction is reduced. Thus, the image deformation is performed in stages. For this reason, when a panoramic composite image is displayed as a moving image, an unnatural motion can be prevented from occurring in the shape of the photographic subject that appears in an image, without giving a viewer a feeling that something is wrong.

BRIEF DESCRIPTION OF DRAWINGS

FIG. 4A1 is a diagram illustrating a composite image that results from simple composition in which the parallax correction is not performed;

FIG. 4A2 is a diagram illustrating a composite image that results from performing the parallax correction;

FIG. 4B1 is an enlarged diagram illustrating a peripheral portion of a foreground shape in the composite image that is illustrated in FIG. 4A1;

FIG. 4B2 is an enlarged diagram illustrating a peripheral portion of a foreground shape in the composite image that is illustrated in FIG. 4A2;

FIG. 16 is a flowchart illustrating a flow of processing operations by the image processing device according to the exemplary embodiment; and.

FIGS. 17A and 17B are explanatory diagrams illustrating details of processing in Step ST107 in FIG. 16.

DETAILED DESCRIPTION OF THE PREFERRED EMBODIMENTS

Exemplary Embodiments of the present inventions will be described below referring to the accompanying drawings.

First Exemplary Embodiment

Figure 1:
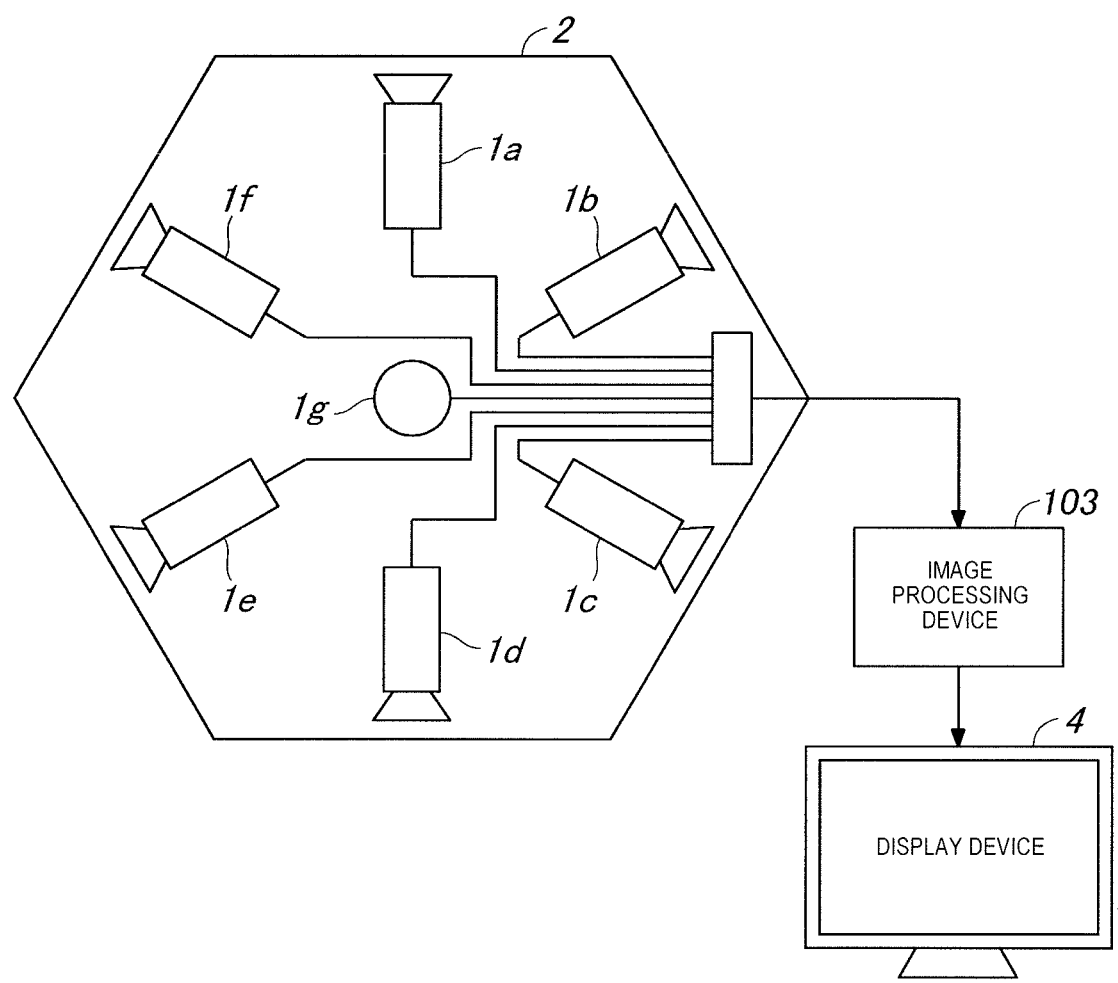
FIG. 1 is a diagram illustrating an entire configuration of an image processing system according to a first exemplary embodiment.
Figure 2:
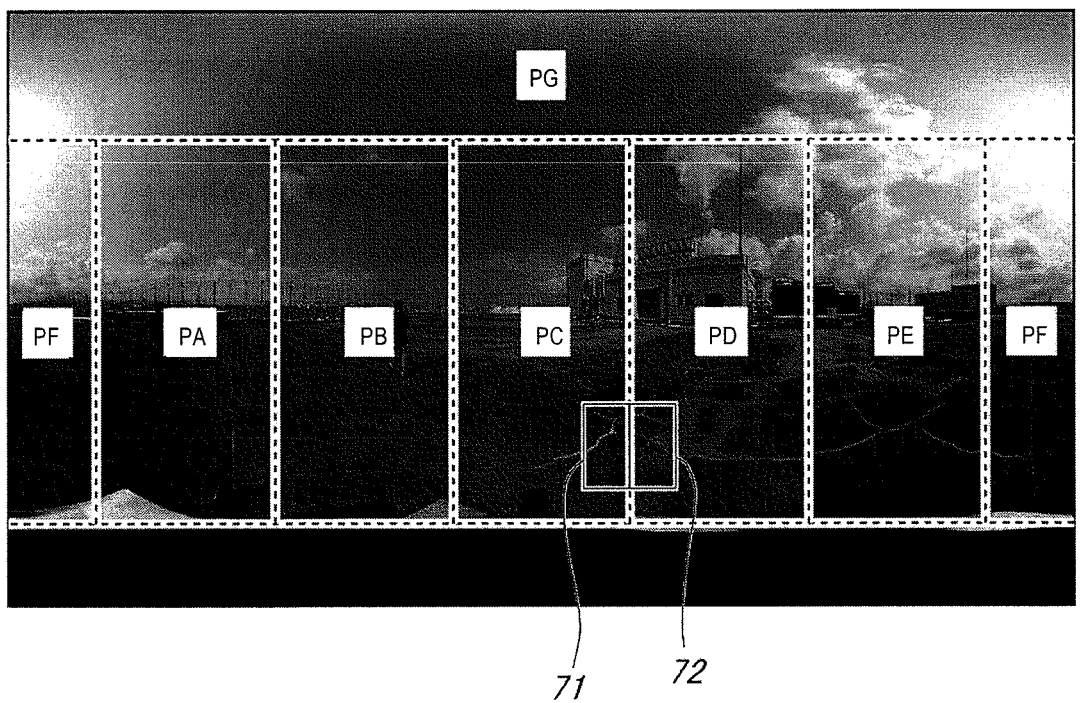
FIG. 2 is an explanatory diagram illustrating a composite image that is generated in an image processing device and is displayed on a display device.

FIG. 1 is a diagram illustrating an entire configuration of an image processing system according to a first exemplary embodiment. FIG. 2 is an explanatory diagram illustrating a composite image that is generated in image processing device 3 which is illustrated in FIG. 1 and is displayed on display device 4.

The present image processing system, as illustrated in FIG. 1, includes camera unit 2 having first to seventh cameras 1a to 1g, image processing device 3, and display device 4.

Cameras 1a to 1g each have a wide angle of view (for example, 120 degrees). First to sixth cameras 1a to 1f are arranged at equal distances in a circumferential direction in such a manner that an optical axis is in a radial pattern in an approximately horizontal direction. Seventh camera 1g is arranged in such a manner that the optical axis is in approximately vertical direction. Cameras 1a to 1g are arranged in such a manner that portions of image capture areas of two adjacent cameras among cameras 1a to 1g overlap.

In image processing device 3, as illustrated in FIG. 2, processing (stitching) that composites captured images PA to PG which are acquired by first to seventh cameras 1a to 1g and generates one composite image (a panoramic image) is performed on every frame, a composite image of every frame is output to display device 4, and the composite image is displayed, as a moving image, on display device 4.

Next, parallax correction that is performed in image processing device 3 which is illustrated in FIG. 1 is described. For the sake of description, an example is taken in which images that are captured by two adjacent cameras 1a and 1b are processed.

Figure 3:
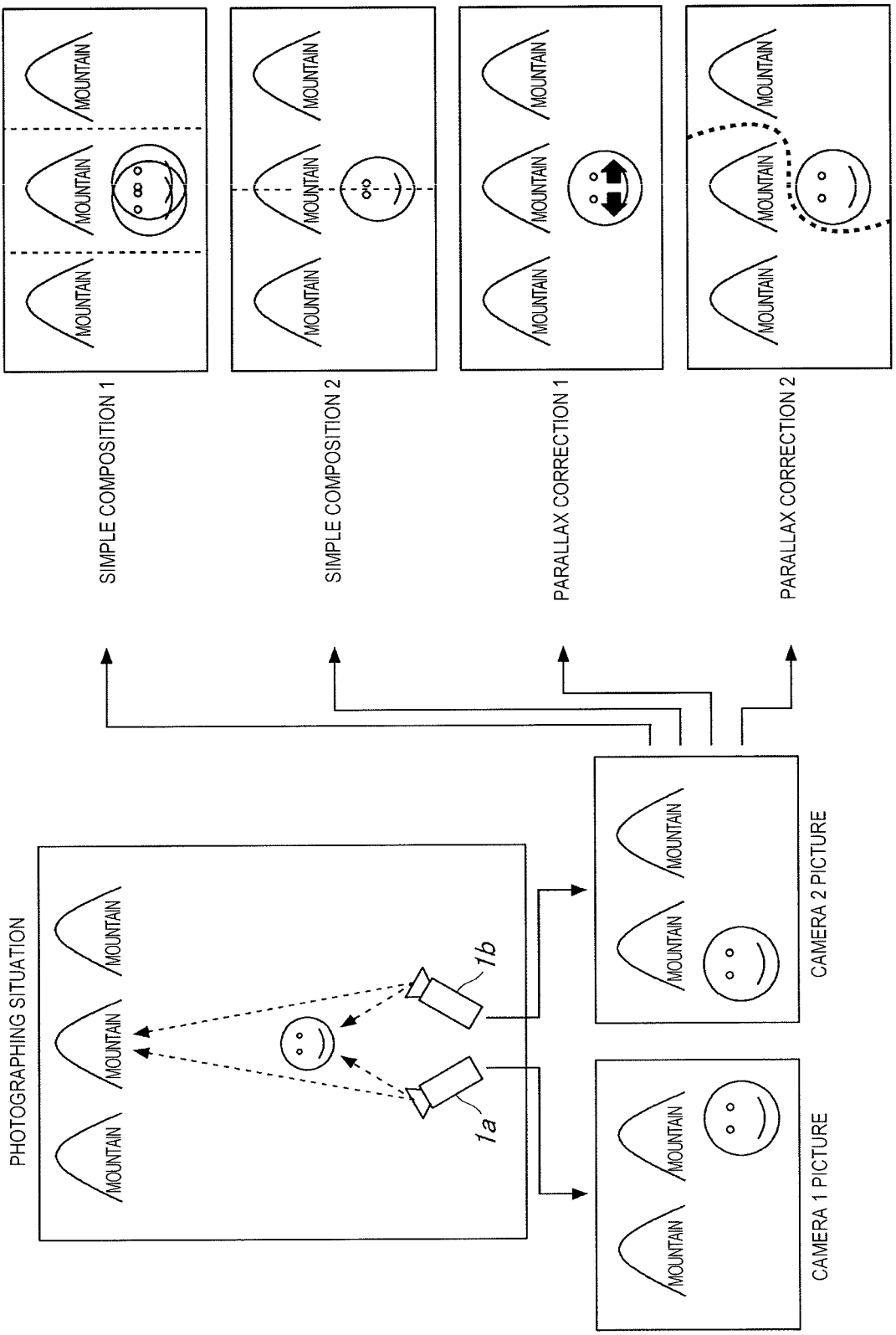
FIG. 3 is an explanatory diagram that schematically illustrates states of images in a case where the parallax correction is not performed and in a case where the parallax correction is performed.

FIG. 3 is an explanatory diagram that schematically illustrates states of images in a case where the parallax correction is not performed and in a case where the parallax correction is performed. An "image capture situation" that is illustrated on the upper left portion of FIG. 3 is an image capture situation in which images are captured by two adjacent cameras 1a and 1b. In an example in the "image capture situation", a person and a mountain behind the person, as a background of a scene, are photographed at the same time by two cameras 1a and 1b.

A "camera 1 picture" and a "camera 2 picture" that are illustrated on the lower left portion of FIG. 3 are captured images that are acquired by two cameras 1a and 1b. As illustrated in the "camera 1 picture" and the "camera 2 picture", in the captured images that are acquired by two cameras 1a and 1b, a background shape that expresses the mountain and a foreground shape that expresses the person appear in image areas of boundary portions that correspond to overlapping portions of the image capture areas of two cameras 1a and 1b. At this point, a state is attained in which distances of the mountain in the background and the person in the foreground from cameras 1a and 1b are greatly different from each other, and in which deviation takes place in a positional relationship between the background shape and the foreground shape in the two captured images.

A "simple composition 1" and a "simple composition 2" that are illustrated on the upper right portion of FIG. 3 express composite images that are obtained by performing simple composition on the captured images that are acquired by two cameras 1a and 1b, based on the background shape. As described above, because the deviation takes place in the positional relationship between the background shape and the foreground shape in the two captured images, when the two captured images are simply composed, as illustrated in FIGS. 3C1 and 3C2, a defect occurs in that the same two foreground shapes appear in an overlapping manner or one portion of the foreground shape is lost.

At this point, deviation of the foreground shape that results when the background shape serves as a reference expresses parallax between the captured images that are acquired by two cameras 1a and 1b. The positional relationship of the background shape that appears in each of two cameras 1a and 1b is obtained in advance in a state where the foreground image subject is not present, and image composition is performed based on this information. Therefore, in the state where the foreground shape is not present, the parallax is not present in two cameras 1a and 1b. However, when the foreground images subject appears, the parallax occurs between the captured images that are acquired by two cameras 1a and 1b.

In this manner, in a state where the background shape and the foreground shape appear in the image area of the boundary portion in the captured images that are acquired by two cameras 1a and 1b, due to the parallax that occurs between the two captured images, the defect occurs in that the same two foreground shapes appear in an overlapping manner in the composite image. Accordingly, there is a need for the parallax correction to remove the defect. As the parallax correction, there are typically two types of correction schemes. "Parallax correction 1" that is illustrated on the lower right portion of FIG. 3 expresses a composite image that is obtained by a first parallax correction scheme, and "parallax correction 2" that is illustrated on the lower right portion of FIG. 3 expresses a composite image that is obtained by a second parallax correction scheme.

As illustrated in "parallax correction 1", in the first parallax correction scheme, the image composition is performed after the parallax correction that deforms an image in such a manner that the image area in which the foreground shape mainly appears is displaced in a horizontal direction is performed on the captured images that are acquired by two cameras 1a and 1b, in such a manner that the positional relationships between the background shape and the foreground shape in the captured images that are acquired by two cameras 1a and 1b are consistent with each other.

As illustrated in "parallax correction 2", in the second parallax correction scheme, the image composition is performed after a curved stitching boundary is set in such a manner that the image area in which the foreground shape appears is avoided, and trimming that cuts off the captured images that are acquired by two cameras 1a and 1b, along the stitching boundary is performed.

FIG. 4A1 is a diagram illustrating the composite image that results from the simple composition in which the parallax correction is not performed. FIG. 4A2 is a diagram illustrating the composite image that results from performing the parallax correction. FIG. 4B1 is an exploded diagram illustrating a peripheral portion of the foreground shape in the composite image that is illustrated in FIG. 4A1. FIG. 4B2 is an exploded diagram illustrating a peripheral portion of the foreground shape that is illustrated in FIG. 4A2.

As illustrated in FIGS. 4A1 and 4B1, in the simple composition in which the parallax correction is not performed, in the composite image, a defect occurs that causes one portion of the foreground shape to be lost or causes the same two foreground shapes to appear in an overlapping manner. However, as illustrated in FIGS. 4A2 and 4B2, when the parallax correction is performed, the defect as in the simple composition can be reduced and a suitable image can be generated.

The suitable image can be generated by performing the parallax correction in this manner. According to the present exemplary embodiment, the first parallax correction scheme, that is, the parallax correction that deforms an image in such a manner that the image area in which the foreground images subject mainly appears is displaced in the horizontal direction is performed on the captured images that are acquired by two cameras 1a and 1b, in such a manner that the positional relationships between the background shape and the foreground shape in the captured images that are acquired by two cameras 1a and 1b are consistent with each other.

At this point, in some cases, the foreground shape such as that of the person is different from the background shape such as that of the mountain, and changes within a short time. When, with this change in the foreground shape, the parallax between the two captured images becomes a greatly different state within a short time span, an amount of parallax correction changes suddenly that defines the degree to which the image is deformed at the time of the parallax correction. Thus, a noticeable image change between frames occurs. When the composite image is displayed as a moving image, an unnatural motion occurs in a shape of a photographic subject that appears in the image. This gives a viewer a feeling that something is wrong.

For example, when the overlapping portion of each image capture area of two cameras 1a and 1b is moved in such a manner that the person in the foreground is traversed, the image area of the boundary portion in the captured images that are acquired by two cameras 1a and 1b changes from a state in which the foreground shape appears to a state in which the foreground shape disappears and only the background shape is present. At this time, a depth of the image area of the boundary portion, that is, a distance to the photographic subject that appears in the image area of the boundary portion, changes suddenly depending on the presence or absence of the foreground shape. When the depth of the image area of the boundary portion changes suddenly in this manner, the amount of parallax correction also changes suddenly depending on this, and image deformation at the time of the parallax correction takes place suddenly.

Particularly, because the foreground shape is important from the point of view of a person who views the image, when processing in which priority is given to the foreground shape is performed with the foreground shape in focus in such a manner that the defect does not occur in the foreground shape, the background shape is greatly different from an actual form in a state where the foreground shape appears. For this reason, as is the case when the overlapping portion of each of the image capture areas of two cameras 1a and 1b traverses the person, when the state where the foreground shape appears is changed to the state where the foreground shape disappears and the background shape is present and the amount of parallax correction changes suddenly, a great change occurs in the background shape, and for example, the shape of the mountain that does not change is made to change. This gives the viewer the feeling that something is wrong.

Accordingly, according to the present exemplary embodiment, when the parallax correction that uses the first parallax correction, that is, the parallax correction that deforms an image in such a manner that the image area in which the foreground shape mainly appears is displaced in the horizontal direction is performed on the captured images that are acquired by two cameras 1a and 1b, a filter is applied to the amount of parallax correction that is obtained from the parallax between the captured images that are acquired by two cameras 1a and 1b, and processing that limits an amount of change over time is performed on the amount of parallax correction. Because of this, sudden image deformation is suppressed at the time of the parallax correction and it is difficult for the image deformation using the parallax correction to be conspicuous. Thus, the feeling that something is wrong is not given to the viewer when the composite image is displayed as a moving image.

Figure 5:
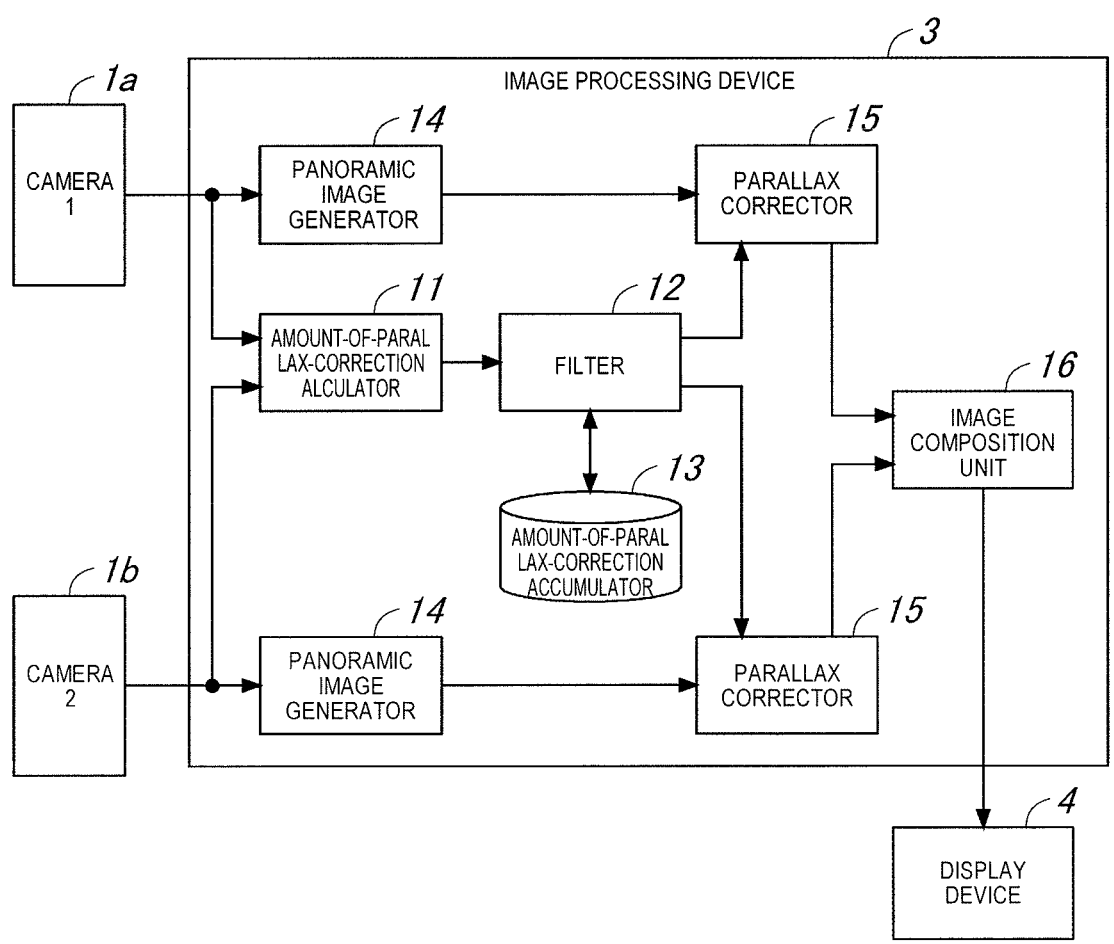
FIG. 5 is a functional block diagram illustrating a schematic configuration of the image processing device.
Figure 6:
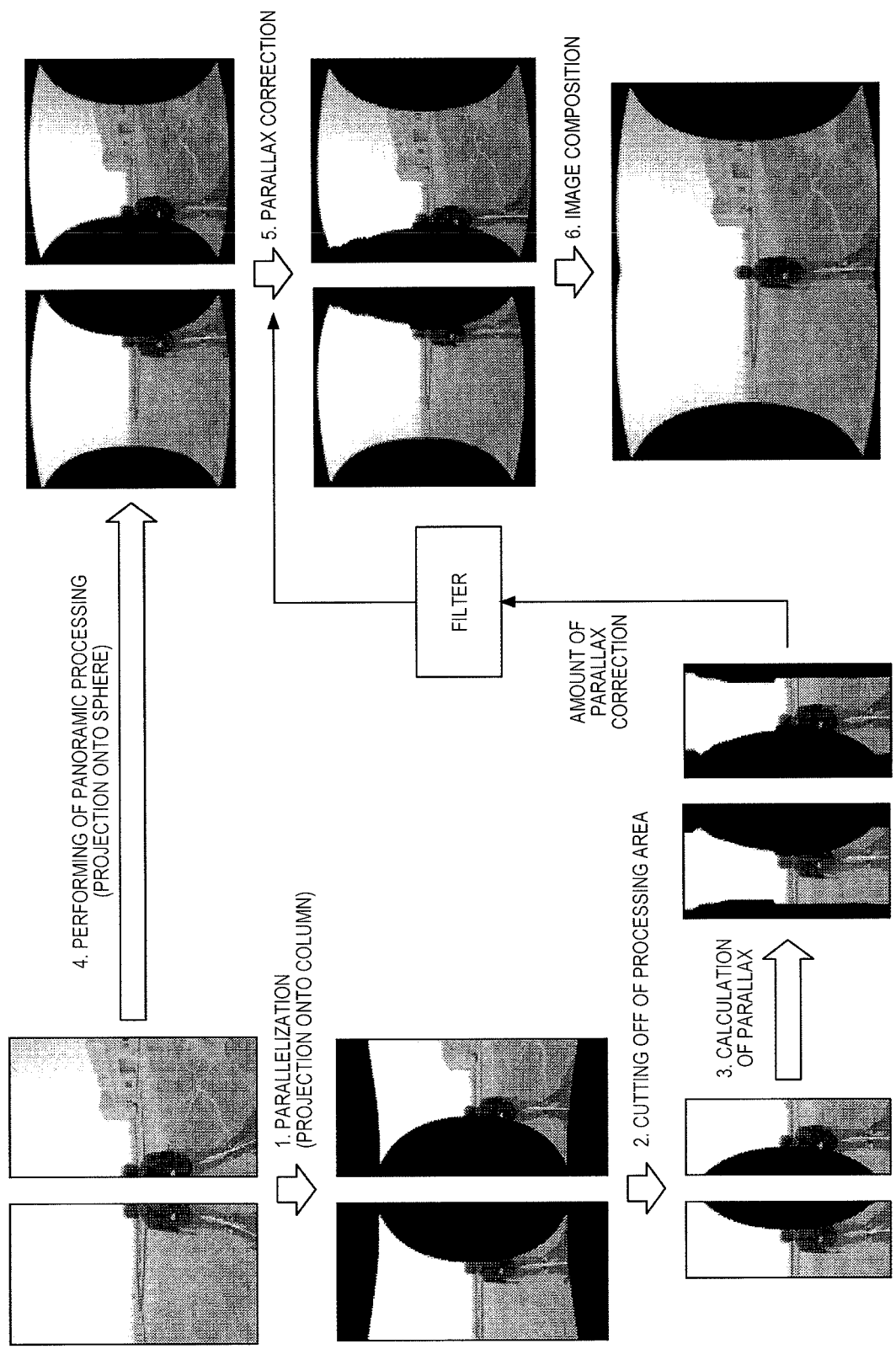
FIG. 6 is an explanatory diagram for describing an outline of processing that is performed in the image processing device.

Next, processing that is performed in image processing device 3 which is illustrated in FIG. 1 is described. FIG. 5 is a functional block diagram illustrating a schematic configuration of image processing device 3. FIG. 6 is an explanatory diagram for describing an outline of the processing that is performed in image processing device 3.

Image processing device 3 includes amount-of-parallax-correction calculator 11, filter 12, amount-of-parallax correction accumulator 13, panoramic image generator 14, parallax corrector 15, and image composition unit 16.

At this point, only the captured images that are acquired by two cameras 1a and 1b, which are processed as one portion, are illustrated. However, as illustrated in FIG. 1, according to the present exemplary embodiment, seven cameras 1a to 1g are provided. Amount-of-parallax-correction calculator 11 and filter 12 are provided to every combination of two adjacent cameras among cameras 1a to 1g, and panoramic image generator 14 and parallax corrector 15 are provided to every seven cameras (for example, cameras 1a to 1g).

In amount-of-parallax-correction calculator 11, processing is performed that calculates the amount of parallax correction which defines the degree to which the image is deformed at the time of the parallax correction, for every frame. Specifically, as illustrated in FIG. 6, processing for parallelization (projection onto a column), processing for cutting-off of a processing area, and processing for parallax calculation are performed. In the processing for the parallax calculation, parallax (an amount of deviation) due to block matching between the two captured images is calculated. That is, a difference between the two captured images is calculated while shifting the two captured images little by little, and the parallax is obtained from a positional relation in which the difference is the smallest. At this point, in a case where the foreground shape appears in the captured image, normally, because the foreground shape occupies a large area, the foreground shape has a great influence on a result of the block matching, and deviation of an image, which is obtained by the block matching, becomes deviation of the foreground shape.

In filter 12, the processing that limits the amount of change over time is performed on the amount of parallax correction that is output from amount-of-parallax-correction calculator 11. According to the present exemplary embodiment, the amounts of parallax correction that are output from filter 12 are accumulated in amount-of-parallax correction accumulator 13, and in filter 12, processing is performed that limits an amount of parallax correction for a current (present) frame in such a manner that an amount of change, by which an amount of parallax correction for an immediately preceding (previous) frame, which is accumulated in amount-of-parallax correction accumulator 13, is changed, falls within a predetermined permissible range.

Specifically, an amount Pt-1' of parallax correction for the immediately preceding frame is acquired from amount-of-parallax correction accumulator 13, the acquired amount Pt-1' of parallax correction is compared with an amount Pt of parallax correction for the current frame that is input from amount-of-parallax-correction calculator 11, and thus an amount ($\Delta P = Pt - Pt-1'$) of change is obtained. The amount $\Delta P$ of change is compared with limitation values (a minimum value and a maximum value) $-A$ and $A$ that define the permissible range of the amount of change. In a case where the amount $\Delta P$ falls within the permissible range, the amount Pt of parallax correction that is input from amount-of-parallax-correction calculator 11 is output as is. In a case where the amount $\Delta P$ of change falls outside of the permissible range, the limitation value $A$ or $-A$ is added to the amount Pt of parallax correction that is input from amount-of-parallax-correction calculator 11 and a result of the addition is output. If processing that is performed in filter 12 is expressed as a mathematical formula, the mathematical formula is as follows. With this mathematical formula, an amount Pt' of parallax correction that is output from filter 12 can be obtained.

$$Pt' = \min(\max(Pt - Pt-1', -A), A) + Pt-1'$$

According to the present exemplary embodiment, the amount of parallax correction is set to be limited with the difference (the amount of change) between the amount of parallax correction for the current frame and the amount of parallax correction for the immediately-preceding frame, but the amount of parallax correction may be limited with a ratio (a change rate) of the amount of parallax correction for the current frame to the amount of parallax correction for the immediately preceding. In this case, if processing that is performed in filter 12 is expressed as a mathematical formula, the mathematical formula is as follows. In the maximum formula, Bmin and Bmax are limitation values (a minimum value and a maximum value) that define a permissible range of the change rate.

$$Pt' = \min(\max(Pt/Pt-1', B\min), B\max) \times Pt-1'$$

In addition, the amount of parallax correction for the present frame may be calculated as an average value of amounts of parallax correction for every preceding multiple frames or for preceding or following multiple frames.

In panoramic image generator 14, processing is performed that generates two panoramic images by performing panoramic processing (projection onto a sphere) on the captured image that is output from each of two cameras 1a and 1b.

In parallax corrector 15, processing is performed that generates two parallax correction images by performing the parallax correction on the two panoramic images that are generated in panoramic image generator 14 based on the amount of parallax correction that is output from filter 12.

In image composition unit 16, processing is performed that generates one composite image by performing image composition processing on each of the two parallax correction images that are generated in parallax corrector 15. The composite image that is generated in image composition unit 16 is output to display device 4, and the composite image is displayed on display device 4.

Each unit of image processing device 3 that is illustrated in FIG. 5 is realized by causing a CPU of an information processing apparatus to execute an image processing program. The program may be set to be configured as a dedicated image processing device that is introduced in advance in the information processing device, but may be also set to be provided to a user in a state of being recorded on a suitable program recording medium, as an application program running on a general-purpose OS in a PC as the information processing apparatus, or through a network.

As described above, according to the present exemplary embodiment, in filter 12, because the processing that limits the amount of change over time is set to be performed on the amount of parallax correction that is acquired in amount-of-parallax-correction calculator 11, even if a change in which the two captured images are greatly different in parallax from each other occurs, the amount of parallax correction is set to be changed in stages instead of being suddenly changed. Because of this, the image deformation that is performed in parallax corrector 15 based on the amount of parallax correction is reduced. For example, only one pixel is set not to be moved with one frame. Thus, the image deformation is performed in stages. For this reason, when the composite image is displayed as a moving image, the unnatural motion can be prevented from occurring in the shape of the photographic subject that appears in the image, without giving the viewer the feeling that something is wrong.

Particularly, according to the present exemplary embodiment, the amounts of parallax correction that are output from filter 12 are accumulated in amount-of-parallax correction accumulator 13, the amount of parallax correction for the present frame is limited in filter 12 in such a manner that the amount of change by which the amount of parallax correction for the previous frame that is accumulated in amount-of-parallax correction accumulator 13 is changed falls within the predetermined permissible range, and information on a future frame is unnecessary. For this reason, real time processing that performs composition processing on images that are captured in the camera and that outputs the resulting images in real time can be realized.

Second Exemplary Embodiment

Figure 7:
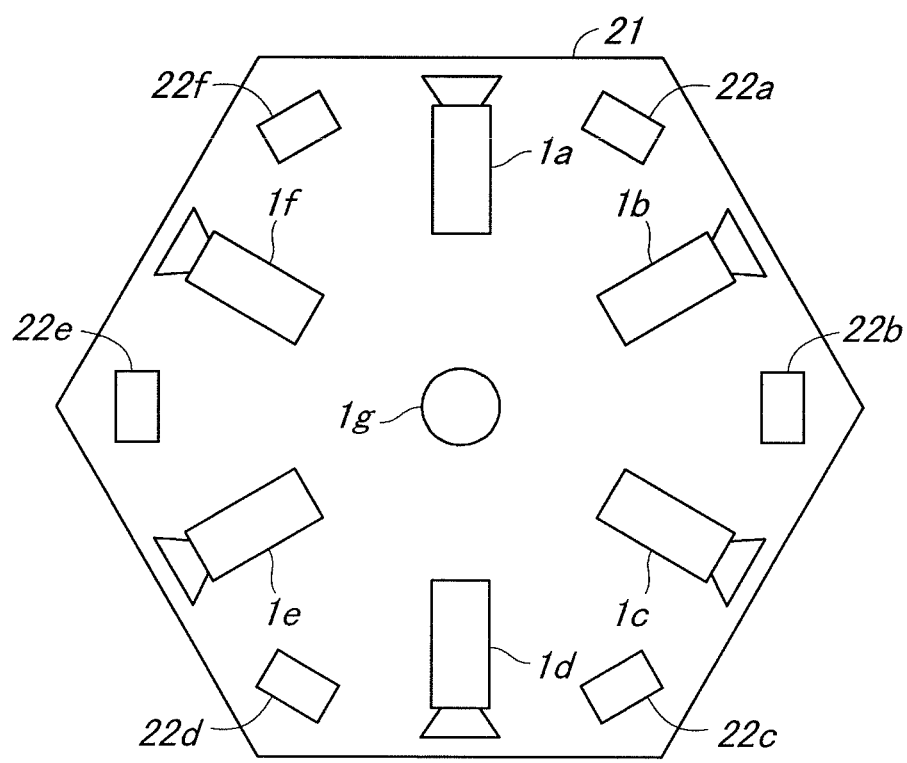
FIG. 7 is an explanatory diagram illustrating a camera unit according to a second exemplary embodiment.
Figure 8:
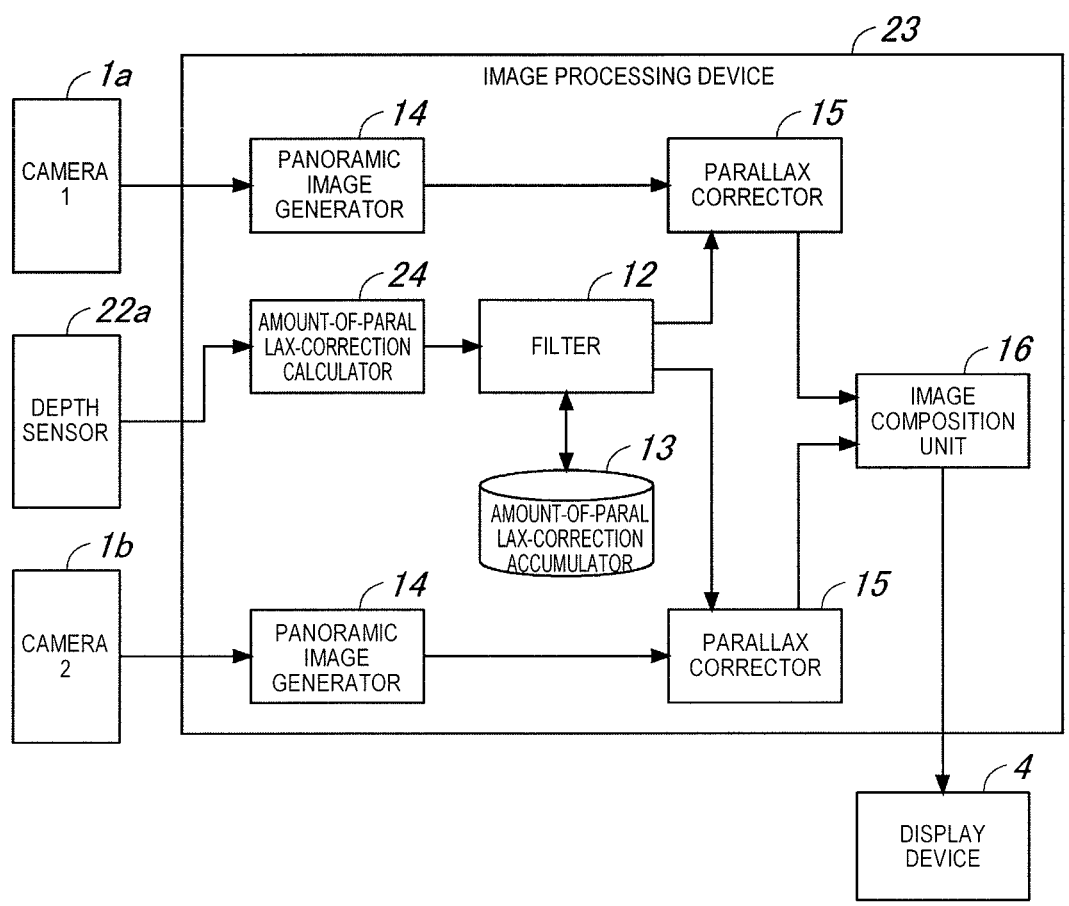
FIG. 8 is a functional block diagram illustrating a schematic configuration of an image processing device according to the second exemplary embodiment.

Next, a second exemplary embodiment is described. FIG. 7 is an explanatory diagram illustrating camera unit 21 according to the second exemplary embodiment. FIG. 8 is a functional block diagram illustrating a schematic configuration of image processing device 23 according to the second exemplary embodiment. What is particularly not mentioned hereinafter is the same as in the exemplary embodiment described above.

According to the first exemplary embodiment, the amount of parallax correction is set to be calculated from the captured images that are acquired by cameras 1a to 1g, but according to the second exemplary embodiment, as illustrated in FIG. 7, depth sensor (distance detection devices) 22a to 22f are provided in camera unit 21 and the amount of parallax correction is set to be calculated based on results of detection by depth sensors 22a to 22f.

Depth sensors 22a to 22f are distance image sensors that detects a depth of an image, that is, a distance to a photographic subject that corresponds to the foreground shape which appears in an image, using a time-of-flight (TOF) scheme. Each of depth sensors 22a to 22f is correspondingly arranged between each of cameras 1a to 1f in such a manner that the depths of the image areas of the boundary portions that correspond to the overlapping portions of the image capture areas of the two adjacent cameras among cameras 1a to 1f can be detected.

As illustrated in FIG. 8, the image processing device 23 includes amount-of-parallax-correction calculator 24 in the same manner as image processing device 23 according to the first exemplary embodiment includes amount-of-parallax-correction calculator 24. However, a result of the detection by depth sensor 22a is input into amount-of-parallax-correction calculator 24, and processing that calculates the amount of parallax correction based on the result of the detection by depth sensor 22a is performed in amount-of-parallax-correction calculator 24. At this point, there is a correlation between the distance to the photographic subject and the parallax, and the amount of parallax correction can be calculated from the result of the detection by depth sensor 22a based on the correlation.

Third Exemplary Embodiment

Figure 9:
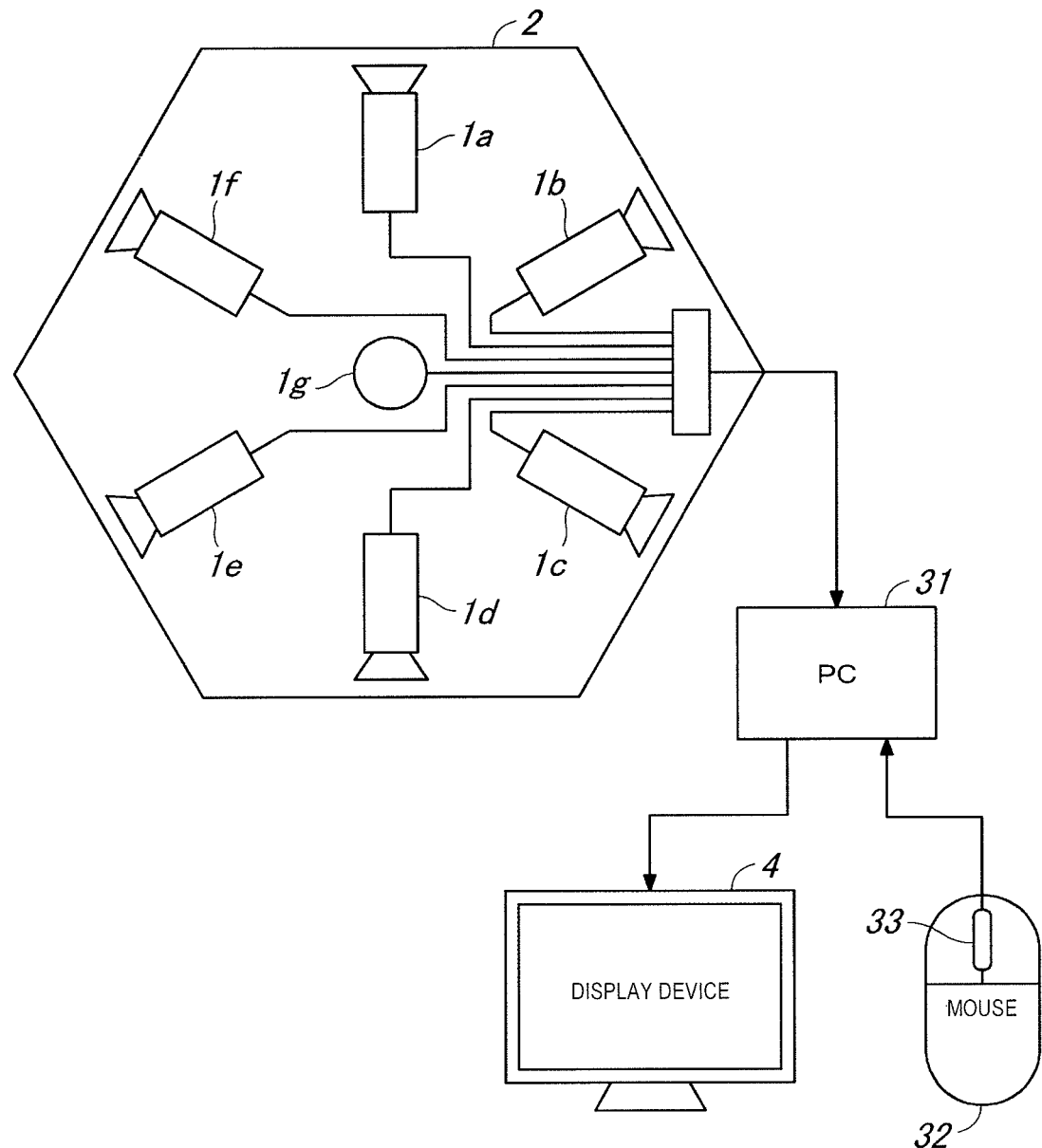
FIG. 9 is a diagram illustrating an entire configuration of an image processing system according to a third exemplary embodiment.
Figure 10:
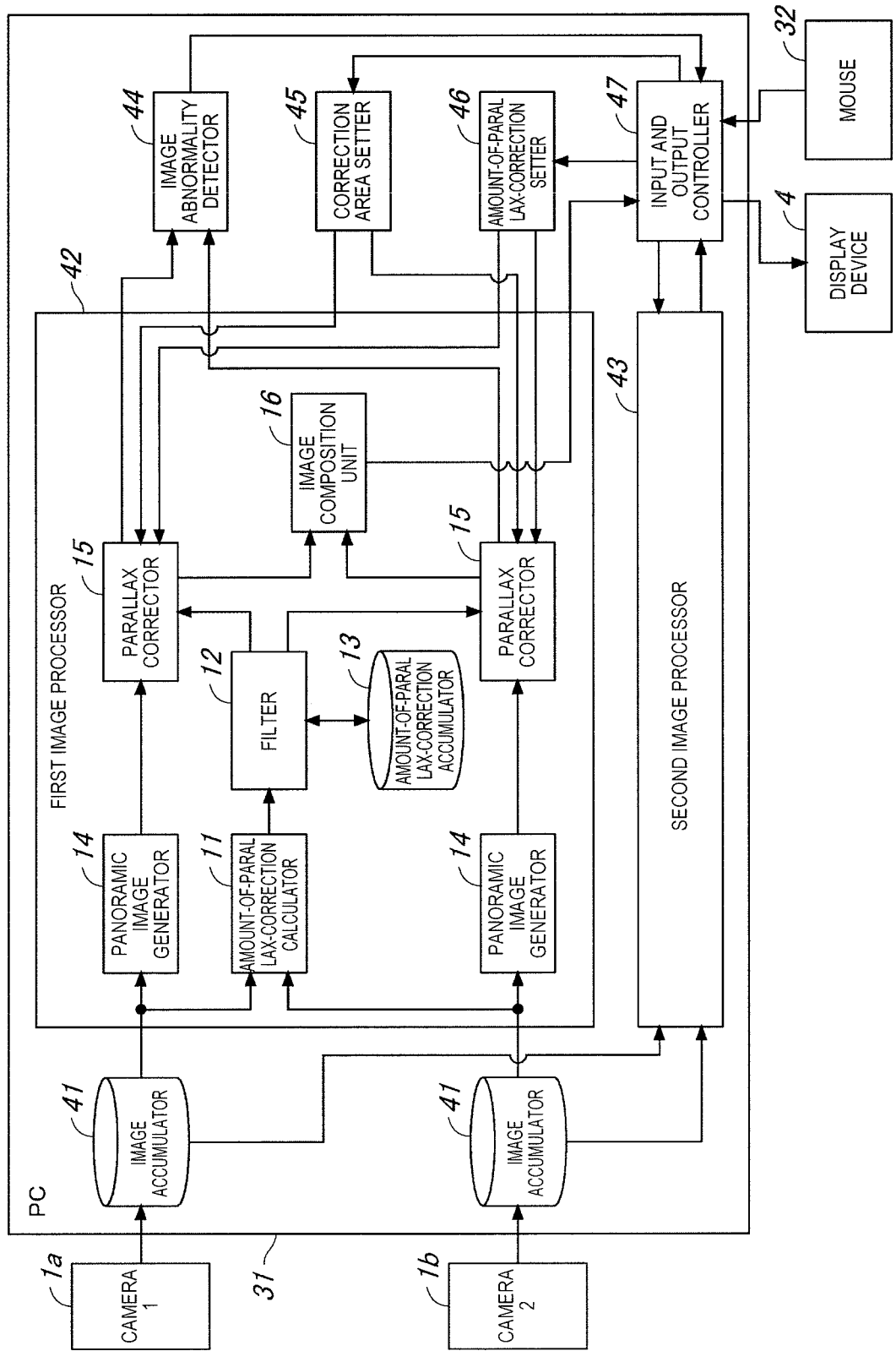
FIG. 10 is a functional block diagram illustrating a schematic configuration of a PC that is illustrated in FIG. 9.
Figure 11A:
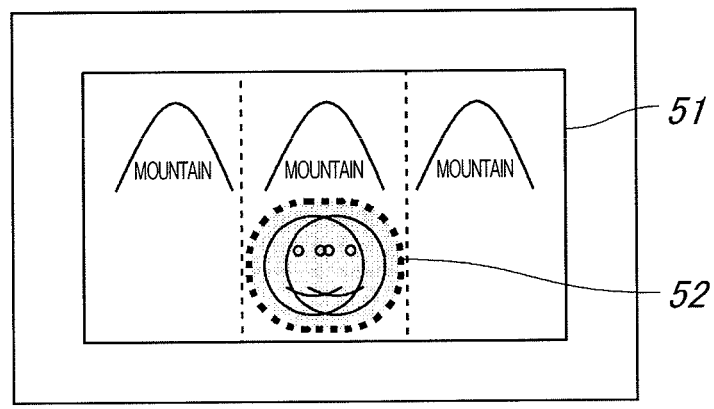
FIGS. 11A to 11C are explanatory diagrams illustrating a screen that is displayed on the display device that is illustrated in FIG. 9.
Figure 11B:
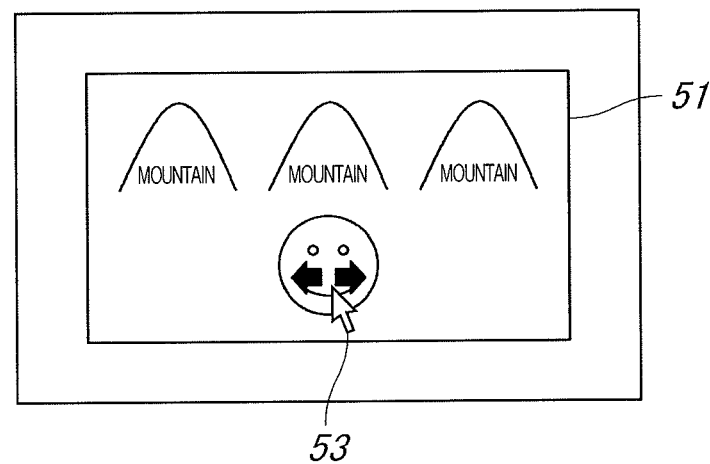
Figure 11C:
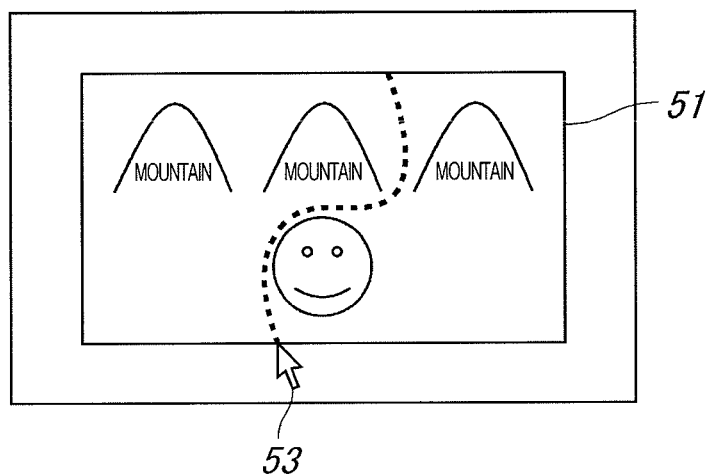

Next, a third exemplary embodiment is described. FIG. 9 is a diagram illustrating an entire configuration of an image processing system according to a third exemplary embodiment. FIG. 10 is a functional block diagram illustrating a schematic configuration of PC 31 that is illustrated in FIG. 9. FIGS. 11A to 11C are explanatory diagrams illustrating a screen that is displayed on display device 4 that is illustrated in FIG. 9. What is particularly not mentioned hereinafter is the same as in the embodiment described above.

The image processing system according to the third exemplary embodiment, as illustrated in FIG. 9, includes camera unit 2, PC 31 (an information processing apparatus), display device 4, and a mouse (an operation input device) 32.

As illustrated in FIG. 10, PC 31 includes image accumulator 41, first image processor 42, second image processor 43, image abnormality detector 44, correction area setter 45, amount-of-parallax-correction setter 46, and input and output controller 47.

Image accumulator 41 are provided in each of camera 1a and 1b, and the captured images that are acquired by each of cameras 1a and 1b are accumulated in image accumulator 41.

In first image processor 42 and second image processor 43, the processing that composites the captured images that are acquired by cameras 1a and 1b and generates the composite image is performed. First image processor 42 employs the first parallax correction scheme for the parallax correction in the same manner as in the first exemplary embodiment. Processing that performs the parallax correction which deforms an image in such a manner that the image area in which the foreground shape mainly appears is displaced in the horizontal direction is performed on the captured images that are acquired by two cameras 1a and 1b, and then the processing that composites the images is performed. First image processor 42 has the same configuration as image processing device 3 (refer to FIG. 5) according to the first exemplary embodiment. Second image processor 43 employs a second correction scheme for the parallax correction, and performs processing that sets the curved stitching boundary in such a manner that the image area in which the foreground shape appears is avoided and that cuts off two images along the stitching boundary and composites the two images.

In image abnormality detector 44, processing is performed that detects an abnormal image area in the composite image, that is, the image area in which the detect that causes the same two foreground shape to appear in an overlapping manner or causes one portion of the foreground shape to be lost occurs. In correction area setter 45, processing is performed that, according to a user input operation that uses mouse 32, sets a correction area which is a target for the parallax correction that is performed in first image processor 42. In amount-of-parallax-correction setter 46, processing is performed that, according to the user input operation that uses mouse 32, sets the amount of parallax correction that is used in first image processor 42. In input and output controller 47, processing is performed that outputs the composite images which are generated in first image processor 42 and second image processor 43 to display device 4 for display on display device 4, and that acquires operation input information in accordance with the user input operation that uses mouse 32.

According to the present exemplary embodiment, there are an image abnormality waring mode, an amount-of-parallax-correction adjustment mode, and a stitching boundary designation mode. The modes will be described below.

First, the image abnormality waring mode is described. In the image abnormality waring mode, the abnormal image area is detected in the composite image, and a warning about the abnormal image area is output to display device 4. When viewing the warning, the user can recognize the abnormal image area, and then, as illustrated in FIGS. 11B and 11C, performs an operation relating to the parallax correction.

At this time, in PC 31, first image processor 42 or second image processor 43 performs the simple composition in which the parallax correction is not performed, on the captured image, image abnormality detector 44 detects the abnormal image area in the composite image, and input and output controller 47 performs processing that displays a warning image indicating the abnormal image area on the composite image, on an screen of display device 4 in a state of being superimposed on the composite image, based on a result of the detection by the image abnormality detector 44.

Specifically, as illustrated in FIG. 11A, composite image 51 that is output from first image processor 42 or second image processor 43 is displayed on a screen of display device 4. Warning image 52 indicating the abnormal image area is displayed on the composite image that is displayed on the screen of display device 4. Warning image 52 is displayed in such a manner as to surround the abnormal image area, that is, the image area in which the defect that causes the same two foreground shapes to appear in an overlapping manner or causes one portion of the foreground shape to be lost occurs. Furthermore, coloring of warning image 52 with red or the like is performed, and painting of warning image 52 is performed in such a manner that warning image 52 is transparent. Because of this, the user can easily identify the abnormal image area.

Because the warning about the abnormal image area is performed in this manner in the image abnormality waring mode, the user can easily recognize the abnormal image area in the composite image, that is, an image area on which the parallax correction has to be performed.

The image abnormality detector 44 may perform the block matching with two images that are output from parallax corrector 15, and may detect an image area that has a big difference, as the abnormal image area in the composite image.

Next, the amount-of-parallax-correction adjustment mode is described. In the amount-of-parallax-correction adjustment mode, the user adjusts the amount of parallax correction that is used for the parallax correction, in the processing that composites images after the parallax correction that uses the first correction scheme, which is performed in first image processor 42, that is, the parallax correction that deforms an image in such a manner that the image area in which the foreground shape mainly appears is displaced in the horizontal direction is performed on the captured images. In the amount-of-parallax-correction adjustment mode, the amount of parallax correction is set according to the user input operation that uses mouse 32 and the composite image that is based on the amount of parallax correction is displayed on display device 4.

At this time, in PC 31, input and output controller 47 acquires input information in accordance with the operation of mouse 32, correction area setter 45 performs the processing that sets the correction area, based on the operation input information that is acquired in input and output controller 47, amount-of-parallax-correction setter 46 performs the processing that sets the amount of parallax correction, based on the operation input information that is acquired in input and output controller 47, and parallax corrector 15 of first image processor 42 performs the parallax correction processing, based on the correction area and the amount of parallax correction that are set in correction area setter 45 and amount-of-parallax-correction setter 46, respectively.

Specifically, as illustrated in FIG. 11B, the composite image that is output from first image processor 42 is displayed on the screen of display device 4, and when viewing the composite image that is displayed on the screen of display device 4, the user designates the abnormal image area with mouse button 53. When this is done, first image processor 42 performs the parallax correction on the image area in the vicinity of a position that is designated with mouse button 53. At this time, by the user operating mouse button 33, the amount of parallax correction is adjusted, and the composite image on which the parallax correction is performed with the amount of parallax correction in accordance with the user operation is displayed on the screen of display device 4.

Therefore, in the amount-of-parallax-correction adjustment mode, while viewing a state of the composite image that is displayed on the screen of display device 4, the user can adjust the amount of parallax correction in such a manner that a suitable composite image is obtained.

According to the present exemplary embodiment, the amount of parallax correction is set to be adjusted with mouse button 33, but the amount of parallax correction may be adjusted with a touch operation such as a pitch-in operation or a pitch-out operation in the information processing apparatus that, like a tablet terminal, includes a touch panel display. Furthermore, even if mouse 32 is used, the amount of parallax correction may be adjusted with another operation such as a drag operation.

Next, the stitching boundary designation mode is described. In the stitching boundary designation mode, the user designates the stitching boundary, in the parallax correction that uses the second correction scheme, which is performed in second image processor 43, that is, in the processing that performs the image composition by setting the curved stitching boundary in such a manner that the image area in which the foreground shape appears is avoided and cutting off two images along the stitching boundary. In the stitching boundary designation mode, according to the user input operation that uses mouse 32, operation input information relating to the stitching boundary is acquired and the stitching boundary is set based on the operation input information.

At this time, in PC 31, input and output controller 47 acquires the operation input information in accordance with mouse 32, and second image processor 43 performs processing that performs the composition by setting the stitching boundary based on the operation input information that is acquired in input and output controller 47 and cutting off images along the stitching boundary.

Specifically, as illustrated in FIG. 11C, with the drag operation of mouse 32, the user designates the stitching boundary in such a manner that the abnormal image area is avoided. At this time, tracks of mouse button 53 are the stitching boundary, and the image composition processing is performed based on the stitching boundary.

At this point, the stitching boundary that is designated by the user, as is, is set to be an actual stitching boundary, and in this state, the image composition processing may be performed, but optimization of the stitching boundary that is based on a cost function may be performed referring to the stitching boundary designated by the user.

With the optimization of the stitching boundary, the stitching boundary is set in such a manner that the image area in which the foreground shape such as that of the person appears, that is, an image area in which the cost function is high is avoided. In other words, the stitching boundary is set in such a manner that the stitching boundary passes through an area in which a pixel value does not change greatly without the foreground shape such as that of the person appearing, that is, an image area in which the cost function is low. At this time, the vicinity of the stitching boundary that is designated by the user is set to be particularly an image area in which the cost function is low, and thus a peripheral portion of the stitching boundary that is designated by the user is preferentially set to be the stitching boundary.

In this manner, in the stitching boundary designation mode, the user can designate the stitching boundary while viewing the state of the composite image that is displayed on display device 4. Furthermore, in a case where the optimization of the stitching boundary is performed referring to the stitching boundary designated by the user, the stitching boundary is easy to optimize and a suitable stitching boundary can be efficiently set.

According to the present exemplary embodiment, the stitching boundary is set to be designated with the drag operation of mouse 32, but in the information processing apparatus that, like the tablet terminal, includes the touch panel, the stitching boundary may be designated with the touch operation of tracing the screen with the user's finger.

Fourth Exemplary Embodiment

Next, a fourth exemplary embodiment is described. An entire configuration illustrating an image processing system according to the fourth exemplary embodiment may be the same as the entire configuration illustrating any of the image processing systems according to the first to third exemplary embodiments. According to the fourth exemplary embodiment, a case where the same entire configuration as that according to the first exemplary embodiment is included is described. However, the image processing system according to the fourth exemplary embodiment includes image processing device 103 instead of image processing device 3 according to the first exemplary embodiment. Image processing device 103 will be described in detail below. The image processing system according to the fourth exemplary embodiment may perform the same parallax correction as that described according to any of the first to third exemplary embodiments.

Figure 12:
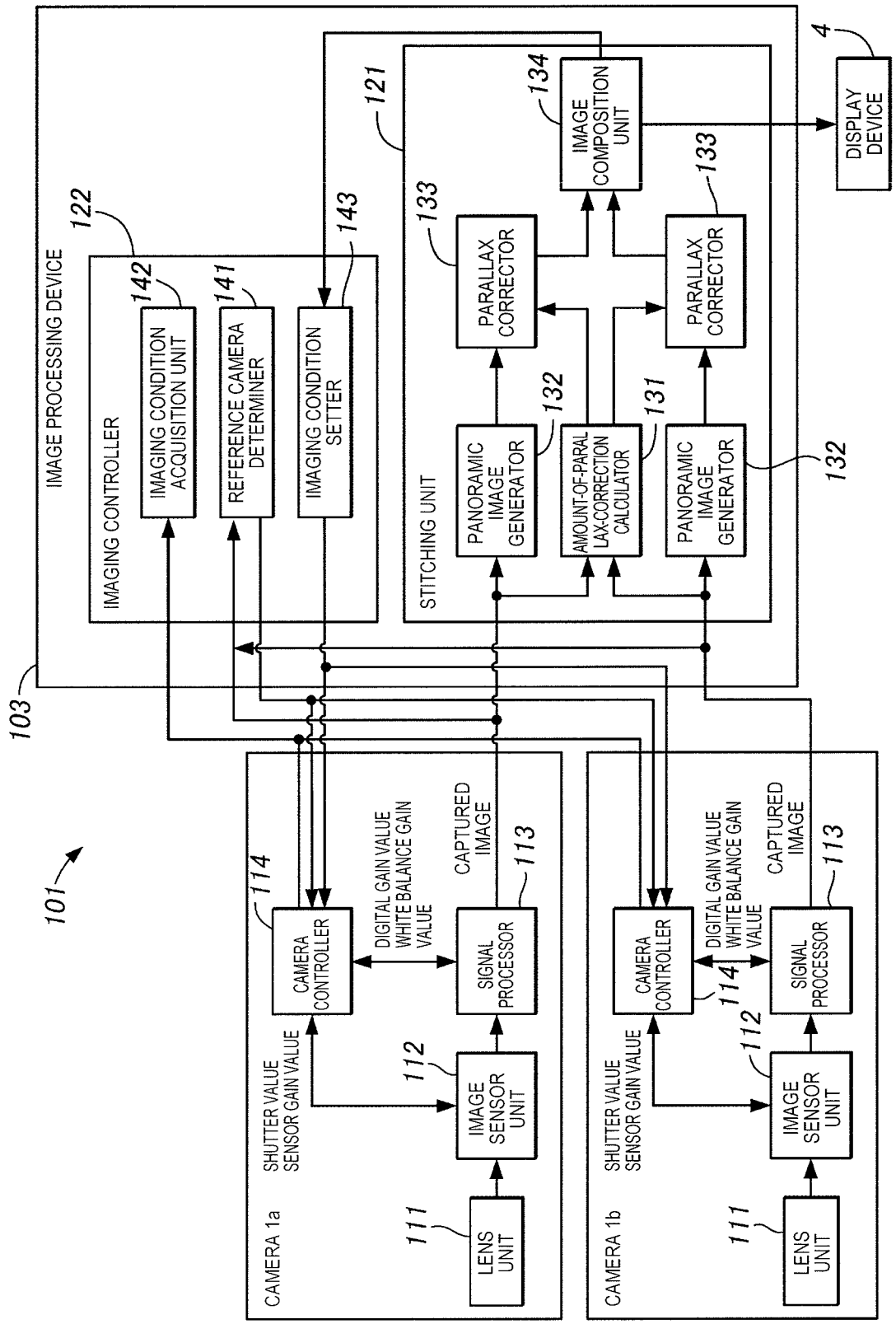
FIG. 12 is a functional block diagram illustrating an imaging system according to a fourth exemplary embodiment.

FIG. 12 is a functional block diagram illustrating imaging system 101 according to the fourth exemplary embodiment of the present invention. At this point, only the captured images that are acquired by two cameras 1a and 1b, which are processed as one portion, but cameras 1c to 1g, which are illustrated in FIG. 1, also have the same configuration. According to the present exemplary embodiment, amount-of-parallax-correction calculator 131 is provided to every combination of two adjacent cameras among cameras 1a to 1g, and panoramic image generator 132 and parallax corrector 133 are provided to every seven cameras (for example, cameras 1a to 1g).

As illustrated in FIG. 12, cameras 1a and 1b have the same configuration. Camera 1a and 1b each include a lens unit 111 that includes an optical system such as lenses, image sensor unit 112 that outputs an image signal (a digital signal) by converting receiving light from lens unit 111 and converting photographic conversion on the received light, signal processor 113 that performs various signal processing operations on the image signal from image sensor unit 112, and camera controller 114 that generally controls operation of image sensor unit 112 and operation of signal processor 113.

Image sensor unit 112 has a well-known configuration that includes a CMOS image sensor, correlated double sampling (CDS), analog front end (AFE), a drive circuit, and the like. Furthermore, in image sensor unit 112, adjustment of exposure (brightness) is possible with a change in a shutter value (a shutter speed) relating to an electronic shutter or a change in a sensor gain value that is applied to an auto gain control (AGC) circuit (that is, to an analog circuit before AD conversion) within the AFE.

Signal processor 113 performs well-known signal processing operations (digital gain adjustment, white balance correction, contour correction, $\gamma$ correction, YC conversion, color difference correction, noise reduction, and the like) on a RAW image that is based on the image signal which is output from image sensor unit 112, and outputs the captured image that is based on luminance and a color difference signal. With a change in a digital gain value relating to the digital adjustment, it is possible for signal processor 113 to adjust the exposure (the brightness). Furthermore, with a change in a white balance gain value relating to the white balance correction, it is possible for signal processor 113 to adjust white balance (shade).

In an auto photographing mode that is executed in cameras 1a to 1g, camera controller 114 controls the sensor gain value and the shutter value of image sensor unit 112, and the digital gain value and the while balance gain value of signal processor 113, in order to perform imaging with suitable exposure and the white balance.

As will be describe below, when the camera to which camera controller 114 belongs is determined by image processing device 3 as a reference camera, camera controller 114 sends imaging conditions (at this point, the shutter value, the sensor gain value, the digital gain value, and the white balance gain value) relating to the exposure and the white balance for image processing device 103. On the other hand, camera controllers 114 in other cameras that are not the reference camera acquire a command to set the imaging conditions relating to the exposure and the white balance in the reference camera, from image processing device 103, and, based on the setting command, performs the setting (at this point, the setting of the shutter value and the sensor gain value of image sensor unit 112, and the setting of the digital gain value and the white balance gain value of signal processor 113) of the imaging conditions relating to the exposure and the white balance.

Image processing device 103 includes stitching unit 121 that composites the captured images in such a manner that the captured images are pasted together, and imaging controller 122 that controls cameras 1a to 1g.

Stitching unit 121 includes amount-of-parallax-correction calculator 131, panoramic image generator 132, parallax corrector 133, and image composition unit 134.

In amount-of-parallax-correction calculator 131, processing is performed that calculates the amount of parallax correction which defines the degree to which the image is deformed at the time of the parallax correction, for every frame. Specifically, the processing operation are performed such as the parallelization (the projection onto the column), the cutting off of the processing area, and the parallax calculation. In the processing for the parallax calculation, parallax (an amount of deviation) due to block matching between the two captured images is calculated. That is, the difference between the two captured images is calculated while shifting the two captured images little by little, and the parallax is obtained from the positional relation in which the difference is the smallest.

In panoramic image generator 132, the processing is performed that generates two panoramic images by performing the panoramic processing (the projection onto the sphere) on the captured image that is output from each of two cameras 1a and 1b.

In parallax corrector 133, based on the amount of parallax correction that is output from amount-of-parallax-correction calculator 131, the parallax correction is performed on the two panoramic images that are generated in panoramic image generator 132, and the processing that generates the two parallax correction images is performed.

In image composition unit 134, the processing is performed that generates one composite image by performing the image composition processing on each of the two parallax correction images that are generated in parallax corrector 133. A panoramic composite image that is generated in an image composition unit 134 is output to display device 4, and the panoramic composite image is displayed on display device 4.

Imaging controller 122 includes reference camera determiner 141, imaging condition acquisition unit 142, and imaging condition setter 143.

The details will be described below, but reference camera determiner 141 determines one among multiple cameras 1a to 1g as the reference camera. It is desirable that the reference camera is a camera that is capable of acquiring the captured image (or an imaging target such as a person, a thing, or one portion of the person or the thing) that the user pays attention to or is likely to pay attention to. Furthermore, imaging condition acquisition unit 142 acquires the imaging conditions (at this points, the shutter value, the sensor gate value, the digital gain value, and the white balance gain value) relating to the exposure and the white balance that are set in the reference camera which is determined by reference camera determiner 141. Furthermore, based on the imaging conditions relating to the exposure and the white balance that are set in the reference camera, imaging condition setter 143 sends the command to set the imaging conditions relating to the exposure and the white balance.

Figure 13:
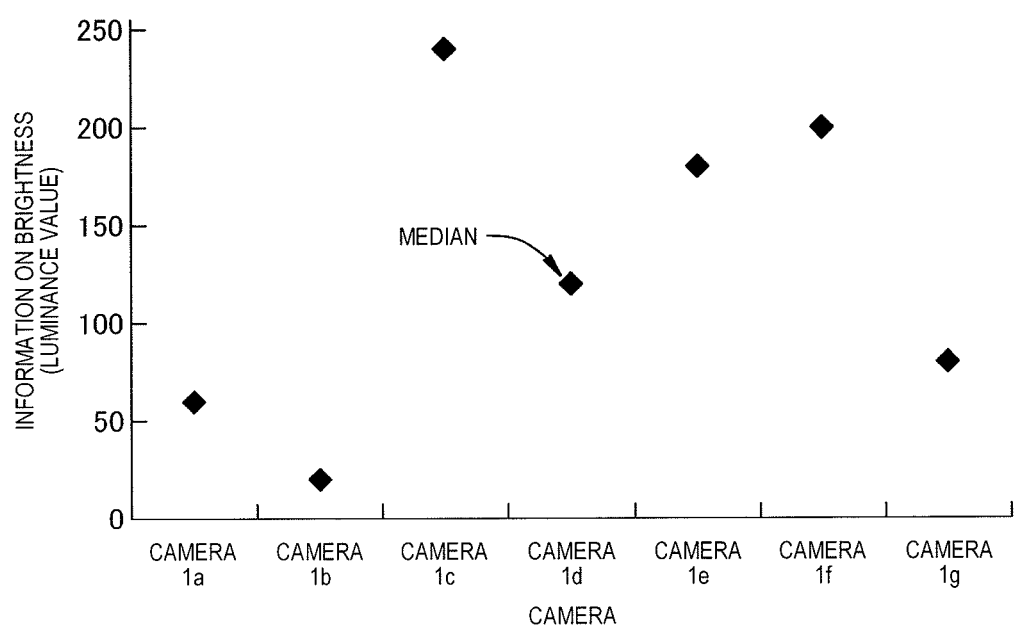
FIG. 13 is an explanatory diagram illustrating a method in which a reference camera determiner determines a reference camera.
Figure 14:
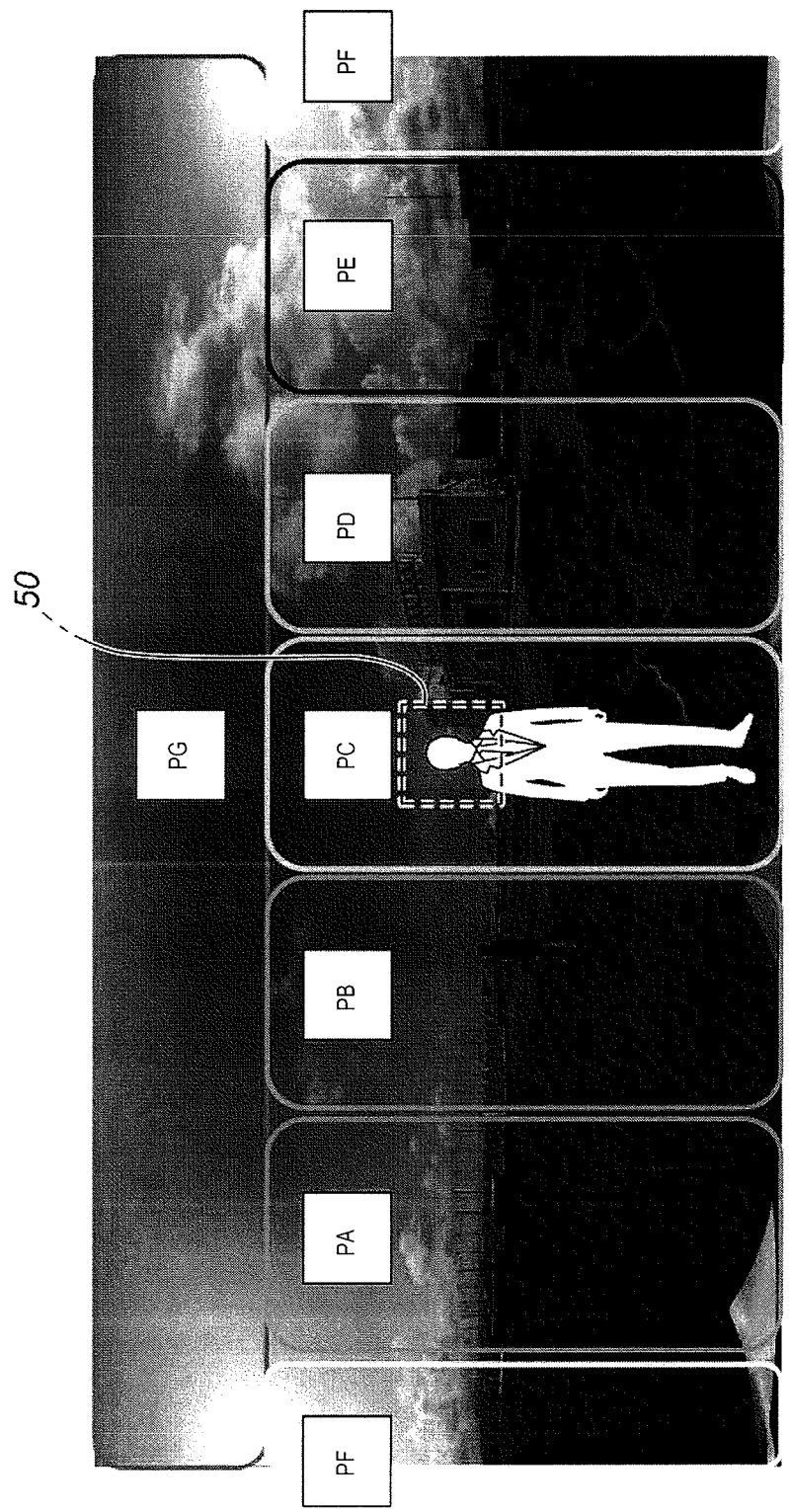
FIG. 14 is an explanatory diagram illustrating a first modification example of the method in which the reference camera determiner determines the reference camera.
Figure 15:
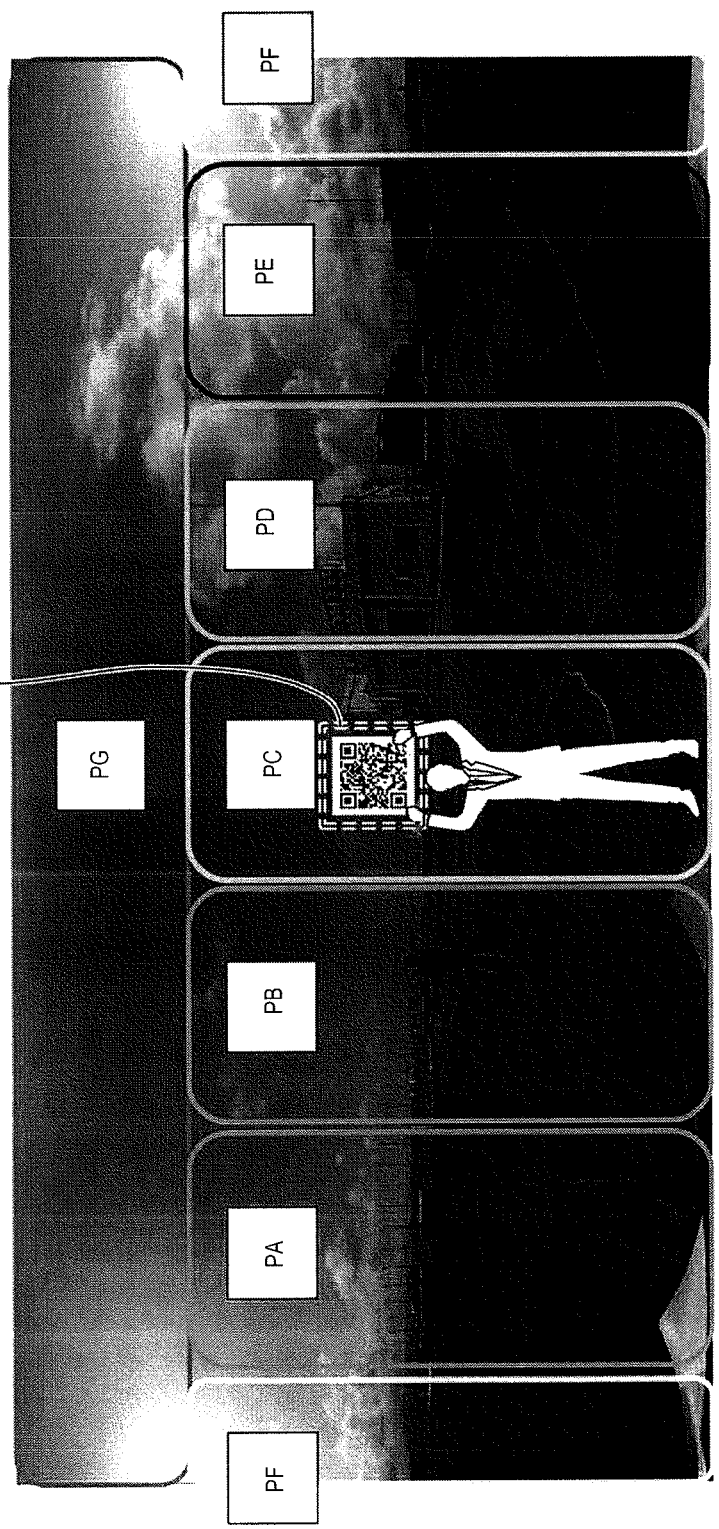
FIG. 15 is an explanatory diagram illustrating a second modification example of the method in which the reference camera determiner determines the reference camera.

FIG. 13 is an explanatory diagram illustrating a method in which reference camera determiner 141 that is illustrated in FIG. 12 determines the reference camera. FIGS. 14 and 15 are explanatory diagrams that illustrates first and second modification examples, respectively, of the method of determining the reference camera.

Reference camera determiner 141 secures the captured image that is acquired by each of cameras 1a to 1g, and, as illustrated in FIG. 13, secures information (at this point, an average of brightness levels of all pixels) on the brightness in each of the captured images. The reference camera determiner 141 determines a camera (at this point, camera 1d) that acquires the captured image that has brightness which is a median of the multiple brightness levels, as the reference camera.

Instead of the camera that acquires the captured image which has the brightness which is the median described above, reference camera determiner 141 may determine a camera that acquires the captured image which brightness that is the closest to an average value of the multiple brightness levels, as the reference camera. Furthermore, there is no need to necessarily set all pixels to be targets for calculation of the brightness in the captured image, and a configuration may be employed in which the brightness is calculated from one area (for example, a range of an image that is selected by the user, or an image area that is occupied by the imaging target which is set by the user).

In the first modification example of the method of determining the reference camera described above, it is also possible that reference camera determiner 141 performs well-known image recognition processing on a photographing target that is set in advance by the user and that the reference camera is determined based on a result of the image recognition. FIG. 14 illustrates an example in which face 150 of a person that is the photographing target is set by the user. Reference camera determiner 141 determines a camera (at this point, camera 1c) that acquires the captured image in which face 150 of the person is detected.

In a case where the face of the person is detected in multiple captured images, reference camera determiner 141 can calculate an area of each face area and can determine a camera that acquires the captured image which has the greatest area of the face area, as the reference camera. Alternatively, reference camera determiner 141 can calculate the number of faces in each of the captured images, and can determine a camera that acquires the captured image which includes the greatest number of faces, as the reference camera. Furthermore, in a separate method, reference camera determiner 141 can detect a predetermined operation (for example, an operation of waving a hand) by the imaging target, which is set in advance by the user and can determine the reference camera based on a result of the detection of the operation.

Additionally, in the second modification example of the method of determining the reference camera described above, it is also possible that reference camera determiner 141 performs the well-known image recognition processing on a predetermined marker that is set in advance by the user and that the reference camera is determined based on a result of the image recognition. FIG. 15 illustrates an example in two-dimensional code 160 that is set in advance is set by the user as a marker. Reference camera determiner 141 determines a camera (at this point, camera 1c) that acquires the captured image which is detected by two-dimensional camera 160, as the reference camera. In this case, the user can designate the reference camera that acquires the captured image which has high importance, by putting up a panel on which two-dimensional code 160 is displayed, on an image capture area of a desired camera. The marker that is used is not limited to the two-dimensional code, and various changes such as a specific color-arrangement in the panel are possible.

Limitation to the examples described above is not imposed, and it is also possible that the reference camera is determined based on a user operation. For example, as illustrated in FIG. 1, a configuration may be employed in which reference camera determination button 165 is provided to each of cameras 1a to 1g and in which reference camera determiner 141 determines a camera in which an operation of reference camera determination button 165 is detected, as the reference camera. Alternatively, in image processing device 103, it is also possible that the user determines a camera (or a camera that acquires the captured image that is selected by the user in a display screen) that is selected through an input display (a keyboard, a touch pad, or the like).

FIG. 16 is a flowchart illustrating a flow of processing operations by image processing device 103 according to the embodiment. FIGS. 17A and 17B are explanatory diagrams illustrating details of processing in Step ST107 in FIG. 16.

As illustrated in FIG. 16, in image processing device 103, processing for setting the imaging conditions for cameras 1a to 1g is performed. In the setting processing of the imaging conditions, as described above, reference camera determiner 141 first determines one among multiple cameras 1a to 1g as the reference camera (ST 101).

Subsequently, imaging condition acquisition unit 142 acquires the imaging conditions relating to the exposure and the white balance that are set in the reference camera (ST 102). Accordingly, imaging condition setter 143 sends the command to set the imaging conditions for the other cameras (cameras other than the reference camera) based on the imaging conditions relating to the exposure and the white balance in the reference camera, which are acquired by imaging condition acquisition unit 142. Camera controller 114 of each of the other cameras, which acquires the setting command (which, at this point, includes the shutter values, the sensor gain value, the data gain value, and the white balance gain value in the reference camera) performs setting of the imaging conditions for the camera to which camera controller 114 belongs, based on the setting command (ST 103). At this point, in the other cameras, the shutter value, the sensor gain value, the digital gain value, and the white balance gain value in the reference camera, as are, are set as the imaging conditions.

Next, in image processing device 103, the image composition processing for the compositing multiple captured images is performed. First, image composition unit 134 selects two adjacent captured images on which the stitching is not yet performed (ST 104) and compares (calculates a difference value) luminance (an average value) Y and color differences (average values) R and B in a boundary area between the two images (ST 105). In this case, values of the luminance Y and the color differences R and B may be acquired only from a pixel in a comparatively-flat area in the boundary area.

Accordingly, in a case where a difference value of the luminance Y in Step ST 105 is a luminance threshold that is set in advance, or below (for example, 4 gray level or below among 256 gray levels) and where each of the difference values of the color differences R and B in Step ST 105 is a color difference threshold that is set in advance, or below (for example, 4 gray level or below among 256 gray levels) (Yes in ST 106), because there is a low likelihood that boundaries of two images will be unnaturally conspicuous, image composition unit 134 performs stitching processing of the two adjacent captured images (ST 108).

On the other hand, in a case where, in Step ST 106, the difference value of the luminance Y exceeds the luminance value that is set in advance or the difference values of the color differences R and B exceed the luminance value (No), image composition unit 134 sends a setting command (a command to correct the imaging conditions) in which at least one or more of the imaging conditions are changed by imaging condition setter 143, to a camera that acquires at least one of the two adjacent captured images described above, in such a manner that the difference value of the luminance value Y and the difference values of the color differences R and B is caused by imaging condition setter 143 to be their respective thresholds or blow (ST 107).

More specifically, for example, as illustrated in "pre-correction" in FIGS. 17A and 17B, it is assumed that, in Step ST 103, as a result of setting a shutter value S, a sensor gain value Gs, a data gain value Gd, and white balance values Gr and Gb (the same as those in the reference camera), luminance Y=120, color difference R=150, and color difference B=100 in boundary area 171 in captured image PC, and luminance Y=132, color difference R=180, color difference B=90 in boundary area 172 in captured image PD. Variance in the luminance Y and the color differences R and B between captured images PC and PD is due to an individual difference (variance in performance) between CMOS image sensors in image sensor unit 112 of each of the cameras.

In this case, in the determination in Step ST 106, the difference value of the luminance Y (at this point, an absolute value of the difference=12) between captured image PC and captured image PD exceeds threshold=4 that is set in advance. Furthermore, the difference values (at this point, an absolute value of the difference of the color difference R=30 and an absolute value of the difference of the color difference B=10) between captured image PC and captures image PD exceed threshold=4 (at this point, the same value in the color differences R and B) that is set in advance.

Accordingly, in Step ST 107, image composition unit 134 sends the setting command in which the digital gain value, and the white balance gain values (which are changed to Gd×1.1, Gr×1.2, and Gb×0.9, respectively) are changed by imaging condition setter 143 for camera 1c, in such a manner that the difference value of the luminance Y and the difference values of the color differences R and B are caused to be their respective threshold or blow.

Because of this, as illustrated in FIGS. 17A and 17B, in boundary area 171 of captured image PC, as in boundary area 172 of captured image PD, luminance Y=132, color difference R=180, and color difference B=90, and the brightness and the shade are averaged in the boundary areas of the two adjacent captured images. Thereafter, the stitching processing of the captured images are performed (ST 108).

At this point, the example is illustrated in which the digital gain value and the white balance gain value are changed (corrected), but, without limitation to this, correction that changes other imaging conditions are changed is also possible. Furthermore, the determination in Step ST 105 is performed on all adjacent captured images as targets, and Step ST 107 is performed whenever necessary. Determination (that is, selection in Step ST 104) in Step ST 106, is performed in order of increasing numbers of the camera from camera 1a to camera 1g, but, without limitation to this, for example, can be performed in the order which the cameras are close to the reference camera in an arrangement in a circumferential direction.

Furthermore, in Step ST 107, the camera to which the setting command is sent by imaging condition setter 143 may be a camera that acquires the captured image that is positioned a distance away from the captured image that is acquired by the reference camera. Furthermore, in Step ST 107, the setting command that changes the digital gain value and the white balance gain value can also be sent to both of the cameras with the luminance Y and the color differences R and B in the reference camera serving as references.

Steps ST 104 to ST 108 are performed repeatedly until the stitching of all the captured images is finally completed (ST 109). Without the need to perform the processing in each of Steps ST 101 to ST 107 and ST 109 on all the captured images (frames), only Step ST 108 may normally be performed, and steps ST 101 to ST 107 and ST 109 may be performed at predetermined time intervals or for every several frames (for example, every 10 frames in a camera picture with 60 fps).

The present invention is described above based on the specific exemplary embodiments, but the exemplary embodiments are only examples, and the present invention is not limited by the exemplary embodiments. Furthermore, all constituent elements of each of the image processing devices according to the exemplary embodiments described above are necessarily essential, and it is possible to make a suitable selection from among the all constituent elements at least within a range that does not depart from the scope of the present invention.

For example, according to the exemplary embodiments described above, the composite image is set to be output by performing the parallax correction processing and the image composition processing in the image processing device (including a PC) that is provided separately from the camera unit which includes the multiple cameras, but the image processing device can be configured as a camera unit (an imaging apparatus) into which the image processing device is built. Additionally, in some cases, it is also possible that the same function as in the image processing device described above is added to at least one camera among the multiple cameras. Furthermore, a configuration may be employed in which a device (an imaging condition-setting device) other than the image processing device performs a function (a function of the imaging controller) of setting the imaging conditions in the image processing device described above.

Furthermore, according to the exemplary embodiment described above, the example is described in which the distance image sensor (the depth sensor) is used as the distance detection device that detects the distance to the photographic subject, but the distance detection device according to the present invention may detect the distance to the photographic subject that corresponds to the foreground shape which appears in the captured image, and is not limited to the distance image sensor.

What is claimed is:

1. An image processing device that is connected to multiple cameras in such a manner that communication with the multiple cameras is possible, and that outputs a panoramic composite image by performing image composition processing on multiple captured images that are acquired from the multiple cameras, the image processing device comprising:
 a processor; and
 a memory including instructions that cause the processor to execute operations, the operations including:
 determining one camera among the multiple cameras as a reference camera;
 acquiring first imaging conditions relating to exposure and white balance which are set in the reference camera;
 sending a first command to set second imaging conditions relating to exposure and white balance, based on the first imaging conditions in the reference camera, to cameras other than the reference camera among the multiple cameras; and
 performing image composition processing on the multiple captured images that are acquired from the multiple cameras and outputting the panoramic composite image,
 wherein the image composition processing includes repeatedly performing second operations until a stitching process is performed for each pair of adjacent images of the captured images, the second operations including:
 selecting two adjacent captured images on which the stitching process is not yet performed;
 generating, based on the two adjacent captured images, two corresponding parallax correction adjacent images in which an amount of parallax correction due to matching between the two adjacent captured images is calculated and corrected;
 calculating a first difference value of luminance and a second difference value of color difference in a boundary area between the two corresponding parallax correction adjacent images;
 in a case where at least one of the first difference value exceeds a luminance threshold or the second difference value exceeds a color difference threshold:
 sending a second command to set third imaging conditions of one of the multiple cameras that acquires one of the two adjacent captured images, in such a manner that the first difference value does not exceed the luminance threshold and the second difference value does not exceed the color difference threshold; and
 performing the stitching process on the two corresponding parallax correction adjacent images; and
 in a case where the first difference value does not exceed the luminance threshold and the second difference value does not exceed the color difference threshold:
 performing the stitching process on the two corresponding parallax correction adjacent images without sending the second command.

2. The image processing device of claim 1,
 wherein the processor acquires information on luminance of the captured images that are acquired from the multiple cameras when determining the reference camera, and determines the one camera that has a luminance that is a median of multiple luminance levels as the reference camera.

3. The image processing device of claim 1,
 wherein the processor acquires information on luminance of the captured images that are acquired from the multiple cameras when determining the reference camera, and determines the one camera that has a luminance that is the closest to an average value of multiple luminance levels as the reference camera.

4. The image processing device of claim 1,
 wherein the processor determines the one camera based on a selection by a user from among the multiple cameras.

5. The image processing device of claim 1,
 wherein the processor acquires a result of image recognition of a predetermined imaging target in the captured images that are acquired from the multiple cameras when determining the reference camera, and determines the one camera as the reference camera based on the result of the image recognition.

6. An imaging system comprising:
 the image processing device of claim 1; and
 the multiple cameras, with the multiple cameras being arranged such that portions of the multiple captured images of two adjacent cameras overlap.

7. An imaging apparatus comprising:
 multiple imaging elements; and
 an image processor that performs image composition processing on multiple captured images that are acquired by the imaging elements and outputs a panoramic composite image,
 wherein the image processor is configured to perform operations including:
 determining one imaging element among the multiple imaging elements as a reference imaging element,
 acquiring first imaging conditions relating to exposure and white balance which are set in the reference imaging element, sending a first command to set second imaging conditions relating to exposure and white balance, based on the first imaging conditions in the reference imaging element, to imaging elements other than the reference imaging element among the multiple imaging elements; and performing image composition processing on the multiple captured images that are acquired from the multiple imaging elements and outputting the panoramic composite image, wherein the image composition processing includes repeatedly performing second operations until a stitching process is performed for each pair of adjacent images of the captured images, the second operations including:

selecting two adjacent captured images on which the stitching process is not yet performed;

generating, based on the two adjacent captured images, two corresponding parallax correction adjacent images in which an amount of parallax correction due to matching between the two adjacent captured images is calculated and corrected;

calculating a first difference value of luminance and a second difference value of color difference in a boundary area between the two corresponding parallax correction adjacent images;

in a case where at least one of the first difference value exceeds a luminance threshold or the second difference value exceeds a color difference threshold:

sending a second command to set third imaging conditions of one of the multiple imaging elements that acquires one of the two adjacent captured images, in such a manner that the first difference value does not exceed the luminance threshold and the second difference value does not exceed the color difference threshold; and performing the stitching process on the two corresponding parallax correction adjacent images; and in a case where the first difference value does not exceed the luminance threshold and the second difference value does not exceed the color difference threshold:

performing the stitching process on the two corresponding parallax correction adjacent images without sending the second command.

8. An image processing method of performing image composition processing on multiple captured images that are acquired by multiple cameras and outputting a panoramic composite image, for use in an image processing device that is connected to the multiple cameras in such a manner that communication with the multiple cameras is possible, the image processing method comprising:

determining one camera among the multiple cameras as a reference camera;

acquiring first imaging conditions relating to exposure and white balance which are set in the reference camera;

sending a first command to set second imaging conditions relating to exposure and white balance, based on the first imaging conditions in the reference camera, to cameras other than the reference camera among the multiple cameras; and performing image composition processing on the multiple captured images that are acquired from the multiple cameras and outputting the panoramic composite image, wherein the image composition processing includes repeatedly performing second operations until a stitching process is performed for each pair of adjacent images of the captured images, the second operations including:

selecting two adjacent captured images on which the stitching process is not yet performed;

generating, based on the two adjacent captured images, two corresponding parallax correction adjacent images in which an amount of parallax correction due to matching between the two adjacent captured images is calculated and corrected;

calculating a first difference value of luminance and a second difference value of color difference in a boundary area between the two corresponding parallax correction adjacent images;

in a case where at least one of the first difference value exceeds a luminance threshold or the second difference value exceeds a color difference threshold:

sending a second command to set third imaging conditions of one of the multiple cameras that acquires one of the two adjacent captured images, in such a manner that the first difference value does not exceed the luminance threshold and the second difference value does not exceed the color difference threshold; and performing the stitching process on the two corresponding parallax correction adjacent images; and in a case where the first difference value does not exceed the luminance threshold and the second difference value does not exceed the color difference threshold:

performing the stitching process on the two corresponding parallax correction adjacent images without sending the second command.

9. An image processing method of performing image composition processing on multiple captured images that are acquired from multiple imaging elements and outputting a panoramic composite image, for use in an imaging apparatus that includes the multiple imaging elements, the image processing method comprising:

determining one imaging element among the multiple imaging elements as a reference imaging element;

acquiring first imaging conditions relating to exposure and white balance which are set in the reference imaging element;

sending a first command to set second imaging conditions relating to exposure and white balance, based on the first imaging conditions in the reference imaging element, to imaging elements other than the reference imaging element among the multiple imaging elements; and performing image composition processing on the multiple captured images that are acquired from the multiple imaging elements and outputting the panoramic composite image, wherein the image composition processing includes repeatedly performing second operations until a stitching process is performed for each pair of adjacent images of the captured images, the second operations including:

selecting two adjacent captured images on which the stitching process is not yet performed;

generating, based on the two adjacent captured images, two corresponding parallax correction adjacent images in which an amount of parallax correction due to matching between the two adjacent captured images is calculated and corrected;

calculating a first difference value of luminance and a second difference value of color difference in a boundary area between the two corresponding parallax correction adjacent images;

in a case where at least one of the first difference value exceeds a luminance threshold or the second difference value exceeds a color difference threshold:

sending a second command to set third imaging conditions of one of the multiple imaging elements that acquires one of the two adjacent captured images, in such a manner that the first difference value does not exceed the luminance threshold and the second difference value does not exceed the color difference threshold; and performing the stitching process on the two corresponding parallax correction adjacent images; and in a case where the first difference value does not exceed the luminance threshold and the second difference value does not exceed the color difference threshold:

performing the stitching process on the two corresponding parallax correction adjacent images without sending the second command.

* * * * *